(12) United States Patent
Marquezan et al.

(10) Patent No.: US 11,956,132 B2
(45) Date of Patent: Apr. 9, 2024

(54) ANALYTICS GENERATION AND CONSUMPTION IN A MOBILE NETWORK

(71) Applicant: Huawei Technologies Co., Ltd., Shenzhen (CN)

(72) Inventors: Clarissa Marquezan, Munich (DE); Riccardo Trivisonno, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/898,198

(22) Filed: Aug. 29, 2022

(65) Prior Publication Data

US 2023/0069455 A1 Mar. 2, 2023

Related U.S. Application Data

(63) Continuation of application No. PCT/EP2020/055161, filed on Feb. 27, 2020.

(51) Int. Cl.
*H04L 43/06* (2022.01)
*H04L 43/04* (2022.01)

(52) U.S. Cl.
CPC .............. *H04L 43/06* (2013.01); *H04L 43/04* (2013.01)

(58) Field of Classification Search
CPC ................................ H04L 43/04; H04L 43/06
USPC ......................................................... 709/224
See application file for complete search history.

(56) References Cited

U.S. PATENT DOCUMENTS

| 8,185,619 B1 | 5/2012 | Maiocco et al. |
| 2010/0088234 A1 | 4/2010 | Moore et al. |

| 2015/0065121 A1 | 3/2015 | Gupta et al. |
| 2016/0171134 A1 | 6/2016 | Mirabella et al. |
| 2019/0356558 A1* | 11/2019 | Han ........................ H04L 41/14 |
| 2020/0044943 A1* | 2/2020 | Bor-Yaliniz ........ H04L 41/5009 |
| 2022/0321423 A1* | 10/2022 | Norrman ................. H04L 41/12 |

(Continued)

FOREIGN PATENT DOCUMENTS

| CN | 110769455 A | 2/2020 |
| JP | 2021520745 A | 8/2021 |
| KR | 20190132898 A | 11/2019 |

(Continued)

OTHER PUBLICATIONS

Nokia et al., Nov. 22, 2019, Corrections to general and framework parts of analytics, S2-1912272, http://portal.3gpp.org/ngppapp/DownloadTDoc.aspx?contribution Uid=S2-1912272 (Year: 2019).*

(Continued)

*Primary Examiner* — James E Springer
(74) *Attorney, Agent, or Firm* — Leydig, Voit & Mayer, Ltd.

(57) ABSTRACT

A consumer of an analytics output receives control and/or knowledge about a set of parameters that is used for generating the analytics output. A set of baseline parameters is used for generating the analytics output, which (a) is associated with a set of analytics consumers and/or with a set of analytics types, and (b) is related to at least one of a statistical property and/or process and/or an output strategy for providing an analytics output. Network entities and corresponding methods for analytics generation and for consuming analytics may be used for generating an analytics output based on the set of baseline parameters.

23 Claims, 12 Drawing Sheets

(56) References Cited

U.S. PATENT DOCUMENTS

2022/0345865 A1* 10/2022 Munoz De La Torre Alonso ....... H04W 4/60

FOREIGN PATENT DOCUMENTS

| WO | 2019214830 | A1 | | 11/2019 | | |
|---|---|---|---|---|---|---|
| WO | 2019219173 | A1 | | 11/2019 | | |
| WO | 2020027638 | A1 | | 2/2020 | | |
| WO | 2020074092 | A1 | | 4/2020 | | |
| WO | 2020098951 | A1 | | 5/2020 | | |
| WO | 2020169174 | A1 | | 8/2020 | | |
| WO | WO-2021083612 | A1 | * | 5/2021 | ........... | H04L 41/042 |

OTHER PUBLICATIONS

"Shorten attribute names for QoS Sustainability," TSG-CT WG3 Meeting #108-e, E-Meeting, C3-201306, Total 15 pages, 3rd Generation Partnership Project, Valbonne, France (Feb. 19-28, 2020).

"New Key Issue on Multiple NWDAF instances," 3GPP SA WG2 Meeting #135, Split, Croatia, S2-1910575, Total 2 pages, 3rd Generation Partnership Project, Valbonne, France (Oct. 14-18, 2019).

"Clarifications on Potential QoS Change," 3GPP TSG-SA WG2 Meeting #134, Sapporo, Japan, S2-1908221, Total 5 pages, 3rd Generation Partnership Project, Valbonne, France (Jun. 24-28, 2019).

"Corrections to general and framework parts of analytics," SA WG2 Meeting #136, Reno, Nevada, USA, S2-1912272, Total 9 pages, 3rd Generation Partnership Project, Valbonne, France (Nov. 18-22, 2019).

"3rd Generation Partnership Project; Technical Specification Group Services and System Aspects; System architecture for the 5G System (5GS); Stage 2 (Release 16)," 3GPP TS 23.501 V16.3.0, pp. 1-417, 3rd Generation Partnership Project, Valbonne, France (Dec. 2019).

"3rd Generation Partnership Project; Technical Specification Group Services and System Aspects; Architecture enhancements for 5G System (5GS) to support network data analytics services (Release 16)," 3GPP TS 23.288 V16.2.0, pp. 1-57, 3rd Generation Partnership Project, Valbonne, France (Dec. 2019).

"3rd Generation Partnership Project; Technical Specification Group Services and System Aspects; Procedures for the 5G System (5GS); Stage 2 (Release 16)," 3GPP TS 23.502 V16.3.0, pp. 1-558, 3rd Generation Partnership Project, Valbonne, France (Dec. 2019).

"Corrections for analytics exposure framework related parameters," SA WG2 Meeting #134, Sapporo, Japan, S2-1908038, Total 12 pages, 3rd Generation Partnership Project, Valbonne, France (Jun. 24-28, 2019).

"3rd Generation Partnership Project; Technical Specification Group Services and System Aspects; Study of Enablers for Network Automation for 5G (Release 16)," 3GPP TR 23.791 V16.2.0, pp. 1-124, 3rd Generation Partnership Project, Valbonne, France (Jun. 2019).

"3rd Generation Partnership Project; Technical Specification Group Services and System Aspects; Study on enablers for network automation for the 5G System (5GS); Phase 2 (Release 17)," 3GPP TR 23.700-91 V0.3.0, pp. 1-35, 3rd Generation Partnership Project, Valbonne, France (Jan. 2020).

"Proposed New SID on Enablers for Network Automation for 5G—Phase 2," 3GPP TSG-SA WG2 Meeting #133, Reno, USA, S2-1906722, Total 4 pages, 3rd Generation Partnership Project, Valbonne, France (May 13-17, 2019).

"Solution to support Multiple NWDAF Instances," 3GPP SA WG2 Meeting #136, Reno, US, S2-1911341, Total 3 pages, 3rd Generation Partnership Project, Valbonne, France (Nov. 18-22, 2019).

* cited by examiner

ANALYTICS GENERATION AND CONSUMPTION IN A MOBILE NETWORK

CROSS-REFERENCE TO RELATED APPLICATIONS

This application is a continuation of International Application No. PCT/EP2020/055161, filed on Feb. 27, 2020, the disclosure of which is hereby incorporated by reference in its entirety.

FIELD

The present disclosure relates to the generation and consumption of analytics in a mobile network, in particular, in $5^{th}$ generation mobile or cellular communication (5G) systems (5GS) and networks. The present disclosure relates to allowing a consumer of an analytics output to have knowledge about and/or control of a set of baseline parameters for generating the analytics output. The disclosure relates to network entities and corresponding methods for analytics generation and for consuming analytics based on the proposed baseline parameters.

BACKGROUND

Conventionally, an analytics function like a Network Data Analytics Function (NWDAF) generates one or more analytics outputs based on pre-defined sets of parameters, regardless, for instance, of the type of the analytics consumers of the analytics outputs. For example, the NWDAF applies the same selection algorithm of data samples, which are to be used for the analytics generation (i.e. generating and providing the analytics outputs) for consumers of different type, or for consumers of the same type but with different needs or context. In other words, a consumer of NWDAF analytics has no control or knowledge of the parameters, which control the relationship among data quantity (e.g., a relationship among data volume to be used for the analytics generation), quality of the data (e.g., sparse data, aggregated data, smoothed data, etc.), and time dependencies for generating the analytics output.

For instance, if for a Network Function (NF) consumer of analytics, the identification and handling of outlier values is the most important factor, without any information about how the outliers in data samples were considered by the NWDAF in the analytics generation, this NF consumer cannot be certain that the consumed analytics output actually supports its most important operation tasks.

Another example is the situation where a consumer of one or more analytics outputs, after performing a discovery of NWDAF instances (e.g., as described in Clause 6.3.13 in 3GPP TS 23.501), identifies that for a required analytics for a desired area of interest (e.g., a geographical location and/or list of TA(s), and/or list of Cells, i.e., any representation of a spatial area), multiple NWDAFs are required to provide the desired analytics outputs (e.g., if the required area of interest is bigger than the serving area of a single NWDAF). In this case, the consumer would be forced to subscribe to multiple NWDAF instances.

This situation happens, for instance, when an Application Function (AF) subscribes for an analytics output via the Network Exposure Function (NEF). The AF indicates the area of interest of a desired analytics output, and the NEF is the entity that actually identifies the need for multiple analytics outputs (e.g., from the multiple NWDAFs), which are then used for the generation of a single analytics output for the AF.

In this case, the problem lies in the generation and/or composition and/or consolidation of the single analytics output, which is to be exposed to the AF, based on the multiple analytics outputs from the multiple NWDAFs. In particular, it is not guaranteed that even in the case where multiple analytics outputs are required, e.g., from the multiple subscriptions to the multiple NWDAFs, these multiple analytics requests/subscriptions are tailored and accurately reflect the need of the single analytics output required by the analytics consumer, i.e., the AF in this case.

SUMMARY

In view of the above-mentioned problems and disadvantages, embodiments according to aspects of the present disclosure improve the conventional implementations for analytics generation and consumption. Aspects of the present disclosure provide a mechanism, according to which a network entity for analytics generation (e. g. an NWDAF) can generate one or more analytics outputs, which are more accurate for a specific consumer of the analytics output(s).

Embodiments of one or more aspects of the present disclosure are based on the following considerations. Currently, 3GPP TS 23.288 V16.1.0 fails to provide any proper mechanism to assure, for instance, that a NF subscriber has control over input parameters of the NWDAF services for analytics generation, in particular over parameters that regulate the relationship between quality of data and time-dependencies for such analytics generation.

In the current Rel. 16 specification of the NWDAF, there is no mechanism for the consumer of the NWDAF to control baseline conditions of the analytics generation, for instance, a volume of data to define "enough data", or a data quality such as the importance of capturing spikes in collected data, or a tradeoff between the level of accuracy versus time-dependencies.

According to embodiments described in this disclosure, the consumer is able to control the relationship between the quality of the data (e.g., preferred level of accuracy×volume of data×probability of assertion) and time-dependencies for the consumer actually receiving the analytics output, e.g., by indicating at least some of said data as input parameters in a subscription to the NWDAF.

This allows to avoid situations in which:
The consumer of the NWDAF has to wait indefinitely, until the requested level of accuracy is achieved by the NWDAF (and such level of accuracy depends currently solely on the internal definition of the NWDAF logic).
The consumer of the NWDAF does not receive any analytics output, if the time deadline is reached and the level of accuracy is not achieved.

In addition, according to this disclosure, the consumer can have a specific awareness of the data manipulation technique or the data statistical properties (e.g., if outliers in a sample were relevant for the analytics calculations, or if smoothing techniques we applied, etc.) used for generating the analytics output. The consumer can also have awareness of specific algorithms used by the NWDAF, or about the significance of the probability of assertion (current output parameter) in relationship to the data properties (quantify×quality) used for the data analytics calculation. With the knowledge of any information about the data properties associated with a generated analytics (output), the consumer increases its capability to properly interpret and take decisions based on the received analytics (output).

The present disclosure further allows a consumer of an analytics output, particularly in a 5GS, to have knowledge about and/or control of baseline parameters that define the relationship among data quantity, quality and time dependencies for analytics generation used by a network entity for analytics generation in mobile networks (e.g., NWDAF, or Management Data Analytics Service (MDAS)).

In particular, embodiments according to aspects of the present disclosure provide:

- A definition of one or more sets of baseline parameters, which are to be used by a network entity for analytics generation for the generation of one or more analytics outputs, in particular, for control among data quantity and quality×time-dependencies.
- A method for an entity consuming the analytics output(s), to control and/or be aware of the one or more sets of baseline parameters for the generation of the analytics output(s), in particular for establishing the relationship among data quantity and quality×time-dependencies. Generally, three operation modes are thereby proposed:
  Operation Mode 1: The entity consuming the analytics may be aware of one or more sets of baseline parameters.
  Operation Mode 2: The entity consuming the analytics may control one or more sets of baseline parameters.
  Operation Mode 3: The entity consuming the analytics and the network entity for analytics generation may negotiate one or more sets of baseline parameters.

A first aspect of this disclosure provides a network entity for analytics generation of a mobile network, the network entity being configured to: obtain a set of baseline parameters, wherein the set of baseline parameters (a) is associated with a set of analytics consumers and/or with a set of analytics types, and (b) is related to at least one of a statistical property and/or process and/or an output strategy for providing the analytics output; and provide an analytics output for the associated set of analytics consumers and/or the set of analytics types, wherein the analytics output is based on the set of baseline parameters.

The set of analytics consumers can be one of: one type of analytics consumer (e.g. network function of the type Access and Mobility function (AMF); one specific analytics consumer of a given type (e.g. NF is AMF_1 of type AMF); a subset of analytics consumers from a given type (e.g. AMFs of area 1 among all the NFs of type AMF).

The set of analytics types can be one of: one type of analytics (e.g., analytics of type service experience); one or more types of analytics targeting the same UE and/or group of UEs and/or area of interest and/or the same network slice and/or application (e.g., any analytics type that have as analytics target and/or analytics filter set to area of interest "A"; or any analytics type that is generated to network slice "S1"; or any analytics type that is targeting application "Video Streaming"; or analytics type of UE Mobility that is targeting network slice "S2").

The network entity of the first aspect may obtain multiple sets of baseline parameters, wherein each set of baseline parameters may be associated with a different set of analytics consumers and/or set of analytics types, and/or may be related to at least one statistical property and/or process and/or output strategy.

The network entity of the first aspect can generate one or more analytics outputs, which are more accurate for a specific consumer of the analytics output(s).

In an implementation form of the first aspect, the network entity is configured to: obtain a second set of baseline parameters, wherein second the set of baseline parameters (a) is associated with a second set of analytics consumers and/or with a second set of analytics types, and (b) is related to at least one of a second statistical property and/or process and/or a second output strategy for providing the analytics output; and provide an analytics output for the associated second set of analytics consumers and/or the second set of analytics types, wherein the analytics output is based on the second set of baseline parameters.

In an implementation form of the first aspect, the set of baseline parameters comprises at least one of: volume of data for generating the analytics output; one or more statistical property and/or process of data for generating the analytics output; the output strategy for providing the analytics output, wherein the output strategy includes an indication to force the analytics output; a synchronization deadline for providing the analytics output.

In an implementation form of the first aspect, the network entity is further configured to: provide the set of baseline parameters, in particular together with the analytics output.

In an implementation form of the first aspect, the network entity is further configured to: receive a first request to provide the set of baseline parameters for generating the analytics output; and provide the set of baseline parameters in response to the first request.

By providing the set of baseline parameters, the network entity allows a consumer of the analytics output, particularly in a 5GS, to have control and/or knowledge about baseline parameters. In particular, about baseline parameters that define the relationship among data quantity, quality and time dependencies for analytics generation used by a network entity for analytics generation in mobile networks (e.g., NWDAF, or MDAS) for the analytics generation. For instance, this may relate to Operation Mode 1, wherein the consumer of the analytics output may be aware of one or more sets of baseline parameters.

In an implementation form of the first aspect, the first request comprises at least one of: identification of one or more analytics output type, identification of one or more analytics output, one or more type of a consumer of an analytics output, and one or more identification of the consumer of an analytics output.

In an implementation form of the first aspect, the network entity is further configured to: receive a second request indicating a requested set of baseline parameters associated with the set of analytics consumers and/or with the set of analytics types; and wherein the analytics output is based on the requested set of baseline parameters as the set of baseline parameters.

In an implementation form of the first aspect, the network entity is further configured to: receive a second request indicating a requested set of baseline parameters associated with the set of analytics consumers and/or with the set of analytics types; select a subset of baseline parameters from the requested set of baseline parameters, and include the subset of baseline parameters in the set of baseline parameters for generating the analytics output.

The requested set of baseline parameters may be a subset of the set of baseline parameters. Generally, in this disclosures a "set" or a "subset" (of a certain element) may comprises one or more of that element. For instance, a set or subset of baseline parameters may, respectively, comprise one or more baseline parameters. For instance, this may relate to Operation Mode 2, wherein the consumer may control one or more sets of baseline parameters (e.g., here by sending the requested set of baseline parameters).

In an implementation form of the first aspect, the network entity is further configured to: receive a second request indicating a requested set of baseline parameters associated with the set of analytics consumers and/or with the set of analytics types; provide an analytics output, wherein the analytics output is based on a subset of baseline parameters. The subset of baseline parameters may be a subset of (e.g. a selection from) the requested set of baseline parameters.

In an implementation form of the first aspect, the network entity is further configured to: provide an indication of no support and/or no authorization regarding the requested set of baseline parameters, if the requested set of baseline parameters is not supported by the network entity and/or not authorized.

In an implementation form of the first aspect, the second request comprises a request for the analytics output.

In an implementation form of the first aspect, the network entity is further configured to: receive a third request indicating one or more proposed sets of baseline parameters associated with the set of analytics consumers and/or with the set of analytics types; select one or more supported sets of baseline parameters from the proposed sets of baseline parameters, the one or more supported sets of baseline parameters being supported by the network entity; and provide a response to the third request, the response indicating the one or more supported sets of baseline parameters.

The one more proposed set of baseline parameters may be a subset of the set of baseline parameters, or may comprise the set of baseline parameters.

In an implementation form of the first aspect, the response to the third request further comprises an identification of the supported one or more sets of baseline parameters, and the identification of the supported one or more sets of baseline parameters relates the third request to the selected one or more supported sets of baseline parameters.

In an implementation form of the first aspect, the network entity is further configured to: receive a message indicating a selected set of baseline parameters from the one or more supported sets of baseline parameters; and use the selected set of baseline parameters as the set of baseline parameters for generating the analytics output.

This may relate to Operation Mode 3, wherein the analytics consumer and the network entity for analytics generation may negotiate one or more sets of baseline parameters.

In an implementation form of the first aspect, the message indicating a selected set of baseline parameters from the one or more supported sets of baseline parameters further comprises the identification of the supported one or more sets of baseline parameters.

In an implementation form of the first aspect, the network entity is further configured to: obtain the set of baseline parameters for generating the analytics output for the associated set of analytics consumers and/or the set of analytics types by configuration.

In an implementation form of the first aspect, the network entity is a control plane entity, in particular comprising a NWDAF or the network entity is a management plane entity.

A second aspect of this disclosure provides an entity for consuming analytics provided by a network entity for analytics generation of a mobile network, the entity being configured to provide a request for an analytics output, wherein the analytics output is for a set of analytics consumers and/or a set of analytics types; and receive the analytics output, wherein the analytics output is generated by the network entity based on a set of baseline parameters, wherein the set of baseline parameters is (a) associated with the set of analytics consumers and/or with the set of analytics types, and (b) is related to at least one of a statistical property and/or process and/or an output strategy for providing the analytics output.

By requesting the set of baseline parameters, the consumer entity of the second aspect, of the analytics output, may be allowed to have control and/or knowledge about baseline parameters. Further, the analytics output can be tailored for the consumer entity of the second aspect.

In an implementation form of the second aspect, the entity is further configured to: obtain the set of baseline parameters associated with the set of analytics consumers and/or with the set of analytics types, in particular together with a requested analytics output.

In an implementation form of the second aspect, the entity further configured to: provide a first request for the set of baseline parameters for generating the analytics output; and receive the set of baseline parameters in response to the first request.

In an implementation form of the second aspect, the entity is further configured to: provide a second request indicating a requested set of baseline parameters for generating the analytics output; wherein the analytics output is generated by the network entity based on the requested set of baseline parameters.

In an implementation form of the second aspect, the entity is further configured to: provide a third request indicating one or more proposed sets of baseline parameters associated with the set of analytics consumers and/or with the set of analytics types for generating the analytics output; receive one or more supported sets of baseline parameters and/or the identification of the supported one or more sets of baseline parameters, the one or more supported sets being included in the proposed sets of baseline parameters and the identification of the supported one or more sets of baseline parameters relating the third request to the one or more supported sets; and provide a message indicating a selected set of baseline parameters and/or the identification of the supported one or more sets of baseline parameters, the selected set of baseline parameters being selected from the one or more supported sets of baseline parameters; wherein the analytics output is generated by the network entity based on the selected set of baseline parameters.

A third aspect of this disclosure provides a method for analytics generation of a mobile network, the method comprising: obtaining a set of baseline parameters, wherein the set of baseline parameters (a) is associated with a set of analytics consumers and/or with a set of analytics types, and (b) is related to at least one of a statistical property and/or process and/or an output strategy for providing the analytics output; and providing an analytics output for the associated set of analytics consumers and/or the set of analytics types, wherein the analytics output is based on the set of baseline parameters.

In an implementation form of the third aspect, the method further comprises: obtaining a second set of baseline parameters, wherein second the set of baseline parameters (a) is associated with a second set of analytics consumers and/or with a second set of analytics types, and (b) is related to at least one of a second statistical property and/or process and/or a second output strategy for providing the analytics output; and providing an analytics output for the associated second set of analytics consumers and/or the second set of analytics types, wherein the analytics output is based on the second set of baseline parameters.

In an implementation form of the third aspect, the set of baseline parameters comprises at least one of: volume of data for generating the analytics output; one or more statistical property and/or process of data for generating the analytics output; the output strategy for providing the analytics output, wherein the output strategy includes an indication to force the analytics output; a synchronization deadline for providing the analytics output.

In an implementation form of the third aspect, the method further comprises: providing the set of baseline parameters, in particular together with the analytics output.

In an implementation form of the third aspect, the method further comprises: receiving a first request to provide the set of baseline parameters for generating the analytics output; and providing the set of baseline parameters in response to the first request.

In an implementation form of the third aspect, the first request comprises at least one of: identification of one or more analytics output type, identification of one or more analytics output, one or more type of a consumer of an analytics output, and one or more identification of the consumer of an analytics output.

In an implementation form of the third aspect, the method further comprises: receiving a second request indicating a requested set of baseline parameters associated with the set of analytics consumers and/or with the set of analytics types; and wherein the analytics output is based on the requested set of baseline parameters as the set of baseline parameters.

In an implementation form of the third aspect, the method further comprises: receiving a second request indicating a requested set of baseline parameters associated with the set of analytics consumers and/or with the set of analytics types; selecting a subset of baseline parameters from the requested set of baseline parameters, and including the subset of baseline parameters in the set of baseline parameters for generating the analytics output.

In an implementation form of the third aspect, the method further comprises: providing an indication of no support and/or no authorization regarding the requested set of baseline parameters, if the requested set of baseline parameters is not supported by the network entity and/or not authorized.

In an implementation form of the third aspect, the second request comprises a request for the analytics output.

In an implementation form of the third aspect, the method further comprises: receiving a third request indicating one or more proposed sets of baseline parameters associated with the set of analytics consumers and/or with the set of analytics types; selecting one or more supported sets of baseline parameters from the proposed sets of baseline parameters, the one or more supported sets of baseline parameters being supported by the network entity; and providing a response to the third request, the response indicating the one or more supported sets of baseline parameters.

In an implementation form of the third aspect, the response to the third request further comprises an identification of the supported one or more sets of baseline parameters, and the identification of the supported one or more sets of baseline parameters relates the third request to the selected one or more supported sets of baseline parameters.

In an implementation form of the third aspect, the method further comprises: receiving a message indicating a selected set of baseline parameters from the one or more supported sets of baseline parameters; and using the selected set of baseline parameters as the set of baseline parameters for generating the analytics output.

In an implementation form of the third aspect, the message indicating a selected set of baseline parameters from the one or more supported sets of baseline parameters further comprises the identification of the supported one or more sets of baseline parameters In an implementation form of the third aspect, the method further comprises: obtaining the set of baseline parameters for generating the analytics output for the associated set of analytics consumers and/or the set of analytics types by configuration.

In an implementation form of the third aspect, the method is performed by a control plane entity, in particular comprising a NWDAF or is performed by a management plane entity.

A fourth aspect of this disclosure provides a method for an analytics consumer consuming analytics of a mobile network, the method comprising: providing a request for an analytics output, wherein the analytics output is for a set of analytics consumers and/or a set of analytics types; and receiving the analytics output, wherein the analytics output is generated by the network entity based on a set of baseline parameters, wherein the set of baseline parameters is (a) associated with the set of analytics consumers and/or with the set of analytics types, and (b) is related to at least one of a statistical property and/or process and/or an output strategy for providing the analytics output.

In an implementation form of the fourth aspect, the method further comprises: obtaining the set of baseline parameters associated with the set of analytics consumers and/or with the set of analytics types, in particular together with a requested analytics output.

In an implementation form of the fourth aspect, the method further comprises: providing a first request for the set of baseline parameters for generating the analytics output; and receiving the set of baseline parameters in response to the first request.

In an implementation form of the fourth aspect, the method further comprises: providing a second request indicating a requested set of baseline parameters for generating the analytics output; wherein the analytics output is generated by the network entity based on the requested set of baseline parameters.

In an implementation form of the fourth aspect, the method further comprises: providing a third request indicating one or more proposed sets of baseline parameters associated with the set of analytics consumers and/or with the set of analytics types for generating the analytics output; receiving one or more supported sets of baseline parameters and/or the identification of the supported one or more sets of baseline parameters, the one or more supported sets being included in the proposed sets of baseline parameters and the identification of the supported one or more sets of baseline parameters relating the third request to the one or more supported sets; and providing a message indicating a selected set of baseline parameters and/or the identification of the supported one or more sets of baseline parameters, the selected set of baseline parameters being selected from the one or more supported sets of baseline parameters; wherein the analytics output is generated by the network entity based on the selected set of baseline parameters.

A fifth aspect of this disclosure provides a computer program comprising a program code for performing the method according to the method of the third aspect or fourth aspect or any implementation form thereof, when executed on a computer.

A sixth aspect of this disclosure provides a non-transitory storage medium storing executable program code which, when executed by a processor, causes the method according to the third aspect or fourth aspect or any implementation form thereof to be performed.

It has to be noted that all devices, elements, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of exemplary embodiments in relation to the enclosed drawings, in which.

DETAILED DESCRIPTION

Figure 1:
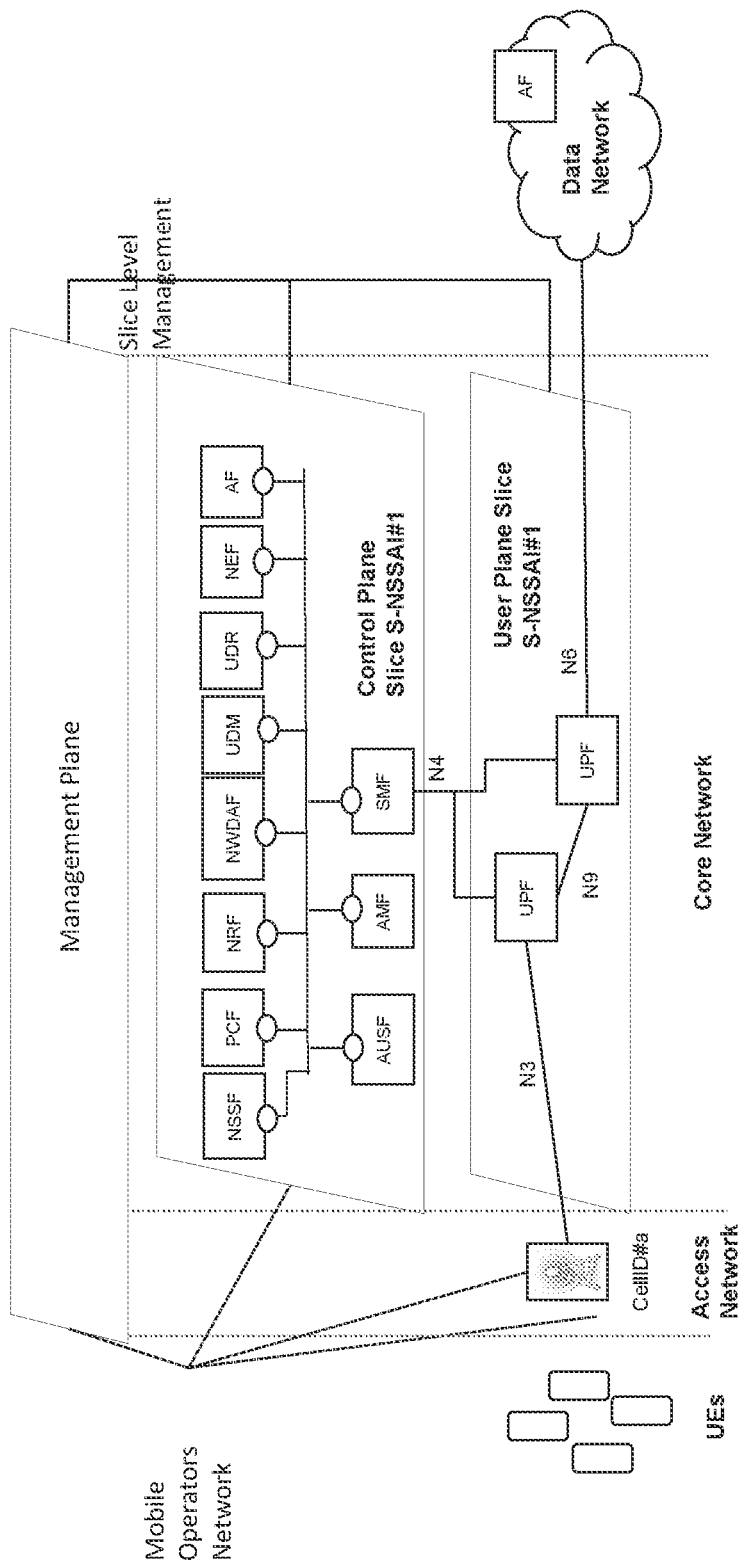
FIG. 1 shows an example of a mobile network architecture, in which embodiments of the disclosure can be applied.

In the following, some terms used in this document are defined.

Analytics Function: is, or is implemented, by a network entity or a NF that receives a request and/or subscription for/to an analytics information from a consumer (entity), and can perform analytics information generation. An example of an Analytics Function is the NWDAF of the 3GPP 5G Architecture defined in TS 23.501.

Analytics information or analytics output: is the output of an Analytics Functions, for instance an Analytics ID as defined in 3GPP TS 23.288, such as the analytics IDs listed in Clauses 6.4-6.9 in TS 23.288 V16.1.0.

Analytics information generation: it is a process in which the Analytics Function, triggers data collection (if data is not available) and/or triggers collection of monitoring data (i.e., raw data) or selects previously collected raw data/monitored data (e.g., throughput of a Cell, bitrate of PDU session ID in an UPF)) and use such data and/or already collected data to perform calculations and/or applies statistical analysis, and/or applies ML/AI techniques (such as regression models, neural networks, etc.) to produce an analytics information.

Analytics output values: for a given type of analytics output, it is the actual values of the analytics output. For instances, if an analytics type is the service experience, the output value is for instance MOS=5 (which means high service experience value).

Baseline parameters: a baseline parameter defines the relationship among data quantity (e.g., data volume to be used for analytics generation); and/or properties of the dataset (e.g., describes properties related to the dataset to be used for analytics generation, e.g., sparse data, aggregated data, smoothed data, etc.), and/or time dependencies for analytics generation. The baseline parameters can be further interpreted as the statistical properties of the data samples and/or statistical methods of manipulation of datasets and/or the mechanisms for forcing analytics output generation. Examples of baseline parameter as statistical properties are: uniformly distributed datasets, datasets without outliers. Examples of baseline parameters as statistical methods are: time dependent weights, covariance. Examples of baseline parameters as mechanisms for forcing an analytics output are related, for instance, to policies define when an analytics output will be generated. We assume that there exists a default policy, for instance, of generating analytics only when level of accuracy is reached regardless of the deadline for analytics output. The mechanisms for forcing analytics output defined in the baseline parameters should override such default policy. For instance, an example of a mechanism to force the analytics output is to create a policy that always sends the analytics output with the level of confidence achieve at the moment.

Mapping/Configuration of baseline parameters: Defines the mapping of a set of baseline parameters to a set of analytics consumers and/or set of analytics types. For instance: any analytics consumer requesting (e.g., associated with) the analytics type "Service Experience" is mapped to the baseline parameters: data volume="30 min of collected data for the inference process", dataset property="with outliers", output strategy="gradient".

Area of Interest: The area of interest defines a spatial and/or location area in any of the terms below:
  Access network cells (e.g., identified by Cell ID(s)).
  Access network tracking area, TA, level (e.g., identified by list of TAI(s), or range of TAIs).
  Geodetic uncertainty shapes (e.g. polygons, circles, etc.).
  Civic addresses (e.g. streets, districts, etc.).
  Datacenter locations.
  Network slice locations (e.g., regions such as City A and City B of a network slice S-NSSAIs).
  Operator network locations (e.g., Operator A in Country X, and Operator A in Country Y)

Monitoring Data/Data Collection: Input information used by an Analytics Functions to generate analytics information.

Coordination Support (CS) role: information that indicates the entity with the capability to operate with the AAP (Analytics Alignment Policy)

Analytics Alignment Policy: data structure (e.g., policy) that defines the mechanism for mapping field types and/or field values of multiple analytics outputs of the same type and/or from different analytics types into a single analytics output that is provided to an analytics consumer. The multiple analytics outputs can be generated from the same Analytics Function or from multiple Analytics Functions.

FIG. 1 describes an example of a possible mobile network architecture, in which embodiments of this disclosure can be applied. In particular, FIG. 1 illustrates a mobile network based on 5G architecture as per 3GPP TS 23.501 specification. It shows the separation among: management plane, control plane, user plane; as well as the separation among access network, core network, data network. The mobile operator can deploy and manage, via management plane different network slices. Such management plane may configure and manages the resources and entities associated with the network slice in both access and core networks. Each network slice may be associated to control plane and user plane entities, i.e., belong, to the same network slice. For simplicity, FIG. 1 illustrates only one network slice identified by S-NSSAI #1 with it associated CP and UP entities of the network slice S-NSSAI #1. The control plane (CP) entities of the mobile operator network manage the connections of the UEs from AN (Access Network) to the data network, eventually it is also possible that external control plane entities (e.g., Application Functions—AF) from external entities can also interact with the mobile operator CP entities, while the user plane entities are the ones actually transmitting the data traffic related to the UEs and applying the control actions/policies defined by the control plane entities.

Figure 2:
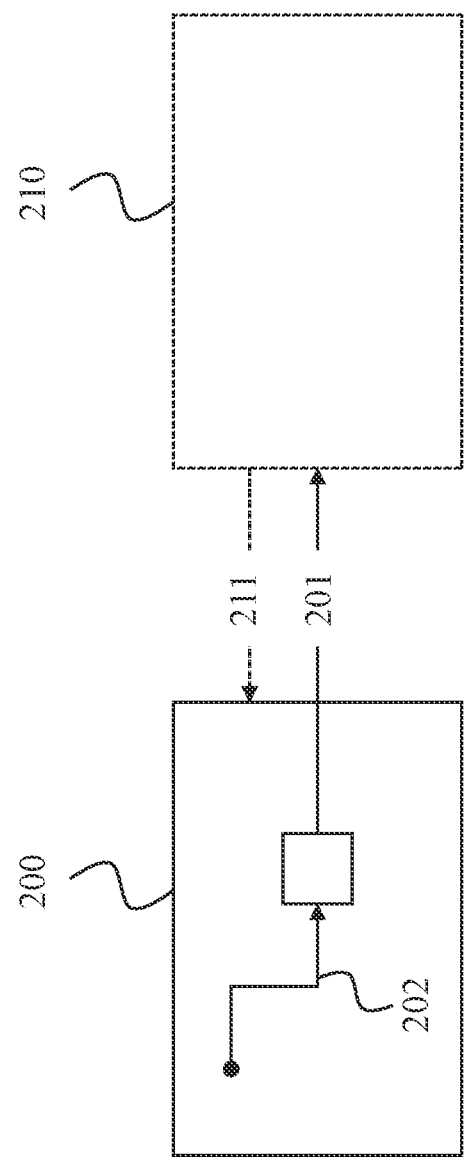
FIG. 2 shows entities according to embodiments of the disclosure interacting with each other.

FIG. 2 shows entities according to embodiments of the disclosure, which may interact with each other. In particular, FIG. 2 shows a network entity 200 for analytics generation interacting with an entity 210 for consuming the analytics generation. The network entity 200 may be, or implement, an Analytics Function for generating the analytics. For instance, the network entity 200 may be, or implement, a NWDAF or MDAS. The entity 210 may be any consumer of the analytics. For instance, the entity 210 may be a PCF, NEF, NF, or NWDAF. Both the network entity 200 and the entity 210, may be implemented in the network architecture of FIG. 1, e.g. as NWDAF 200 and PCF 210 or NEF 210.

The network entity 200 is configured to obtain a set of baseline parameters 202. The set of baseline parameters 202 (a) is associated with a set of analytics consumers and/or with a set of analytics types, and (b) is related to at least one of a statistical property and/or process and/or an output strategy for providing an analytics output 201. The set of baseline parameters 202 may comprises at least one of: volume of data for generating the analytics output 201; one or more statistical property and/or process of data for generating the analytics output 201; the output strategy for providing the analytics output 201, wherein the output strategy includes an indication to force the analytics output 201; a synchronization deadline for providing the analytics output 201.

The network entity 200 is further configured to provide the analytics output 201 for the associated set of analytics consumers and/or the set of analytics types, wherein the analytics output 201 is based on the set of baseline parameters 202. In particular, the analytics output 201 may be generated by the network entity 200, e.g., an Analytics Function of the network entity 200, based on the set of baseline parameters 202. The network entity 200 may further be configured to provide the set of baseline parameters 202, for instance, together with the analytics output 201, or upon request. In particular, the network entity 200 may provide the set of baseline parameters to the entity 210.

The entity 210 is configured to provide a request 211 for an analytics output 201, wherein the analytics output 201 is for a set of analytics consumers and/or a set of analytics types. The network entity 200 may provide the analytics output 201, upon receiving the request 211 from the entity 210. The entity 210 is further configured to receive the analytics output 201, wherein the analytics output 201 is generated by the network entity 200 based on the set of baseline parameters 202.

The entity 210 may be further configured to obtain the set of baseline parameters 202 associated with the set of analytics consumers and/or with the set of analytics types, in particular together with the requested analytics output 201. Thus, the entity 210 gains knowledge about the set of baseline parameters 202 used for generating the analytics output 201. The entity 210 may further be able to control the set of baseline parameters 202 for generating the analytics output, e.g., by sending a requested set of baseline parameters 202 to the network entity 200, or by negotiating a set of baseline parameters 202 with the network entity 200.

The network entity 200 and/or the entity 210 may comprise a processor or processing circuitry and/or a computer program, configured to perform, conduct or initiate the various operations of the network entity 200 and/or entity 210 described herein. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors.

The network entity 200 and/or entity 210 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the network entity 200 and/or entity 210 to be performed.

In one embodiment, the processing circuitry comprises one or more processors and a non-transitory memory connected to the one or more processors. The non-transitory memory may carry executable program code which, when executed by the one or more processors, causes the network entity 200 and/or entity 210 to perform, conduct or initiate the operations or methods described herein.

According to an example, the network entity (200) and/or the entity (210) may be implemented by a software running on a processor on a single device or it may run on several processors in a distributed system.

There may be different alternatives for the network entity 200 to obtain the set of baseline parameters 202. Any combination of the alternatives described below can be applied, to obtain the set of baseline parameters 202.

a. Via configuration, wherein the network entity 200 obtain or has a mapping of the set of baseline parameters 202 that are to be used. Such configuration can be any combination of the following mapping possibilities of baseline parameter values to:

i. All possible analytics types (e.g., analytics IDs) for any analytics consumer and/or consumer instance (e.g., default baseline parameters).
ii. Per analytics type (e.g., specific baseline parameters 202 for the analytics type "Service Experience").
iii. Per analytics consumer type (e.g., consumer of type AF).
iv. Per analytics consumer instance (e.g., AF=XXX).
b. Via derivation, wherein given the request 211 for an analytics output 201, the network entity 200 may, according to some internal logic (e.g., a usage of Machine Learning (ML) or Big Data techniques), be able to determine the set of baseline parameters 202 to be used for the generation of the analytics output 201 requested and/or for a set of analytics types and/or a set of analytics consumer
c. Via request for analytics generation from the entity 210, wherein the entity 210 indicates for at least one analytics output 201, a corresponding set of baseline parameters 202 to be used for generating that analytics output 201 by the network entity 200.
d. Via negotiation between the network entity 200 and the entity 210, wherein both entities 200, 210 are able to provide one or more sets of baseline parameters 202, which they are able to use, and one of the two entities 200, 210 then calculates an intersection of sets of baseline parameters 202 that can be used for analytics generation.

The set of baseline parameters 202 may be related to the description of statistical properties of the dataset or data samples to be selected for analytics generation, and/or mechanisms to force an output of the network entity 200 according to time constraints. The set of baseline parameters 202 can, for example, be any of the information below:

Data volume: defines a quantity of data (samples) to be used for the analytics generation of a specific analytics output 201, e.g., data samples to be selected from a database to be input into a ML, solution (e.g., data samples for training a model or data samples for inference in a trained model) that is able to compute a certain type of analytics output 201. This can be expressed in different ways. For instance, in terms of ranges of percentage of data, which is related to data samples from a database to be eligible to be used for the generation, i.e., computation, of an specific analytics output 201 versus the overall dataset volume for analytics generation of any analytics output 201. Another way is to have a normalized value that determines a mapping of a quantity of data to labels such as high, medium, or low volumes of data. In this case, the data volume may be expressed in terms of the label and the operator or the vendor of the network entity 200 may have a normalized way of expressing the quantity of data available without exposing the actual numerical value of the data samples in a database. Another alternative is to specify the interval of time of the collected data to be used for the analytics generation (which can be further specified into the different phases of analytics generation: training and inference)

Dataset property: defines properties of a dataset and/or instruction for dataset manipulation, sorting, selection, filtering. If properties of a dataset are defined, this can be represented as a dataset with outliers, without outliers, a sparse dataset, an equally distributed dataset, etc. If instruction for data manipulation are used, well-known methods from statistics generation may be used, e.g. ignoring outliers, time dependent weights, etc. The result is that the network entity 200 may use data samples for generating the analytics output 201, which have certain characteristics, such as sparse datasets, uniformly distributed datasets, high data volatility (with outliers), low data volatility (without outliers). The absence of such parameters indicates that no specific dataset manipulation may be required by the entity 210, and that the network entity 200 may be responsible to define the techniques.

Notification/Output Strategy: Defines the mechanism, or flags, that forces the network entity 200 to provide an analytics output 201 to the entity 210. Controls the dependency between analytics accuracy (related to the data volume and dataset property properties) and time-dependent analytics output 201. The output strategy can be set to:

Gradient notification: Always send a notification with the content of the requested analytics ID and the value of the probability assertion, being such value a description of the distance/difference/percentage that such probability of assertion is related to the level of accuracy×data volume. For instance, if it defines a percentage, the value 10% represents that an analytics output 201 has been generated and such output 201 has a representation of only 10% of the baseline parameters 202 related to data volume related to level of accuracy.

Binary notification: Always send a notification. The content of the notification may depend on the level of accuracy. If the level of accuracy is not met, the notification may contain only the level of accuracy set to zero and no content of an analytics output 201. If the level of accuracy is met, the notification may contain the content of the analytics ID and the reached level of accuracy.

Output synchronization deadline: this parameter defines the interval of time prior the "Time when analytics information is needed" that an Analytics Function instance of the network entity 200 may use to send an analytics output 201 to the entity 210, even if the level of accuracy is not met.

Figure 3:
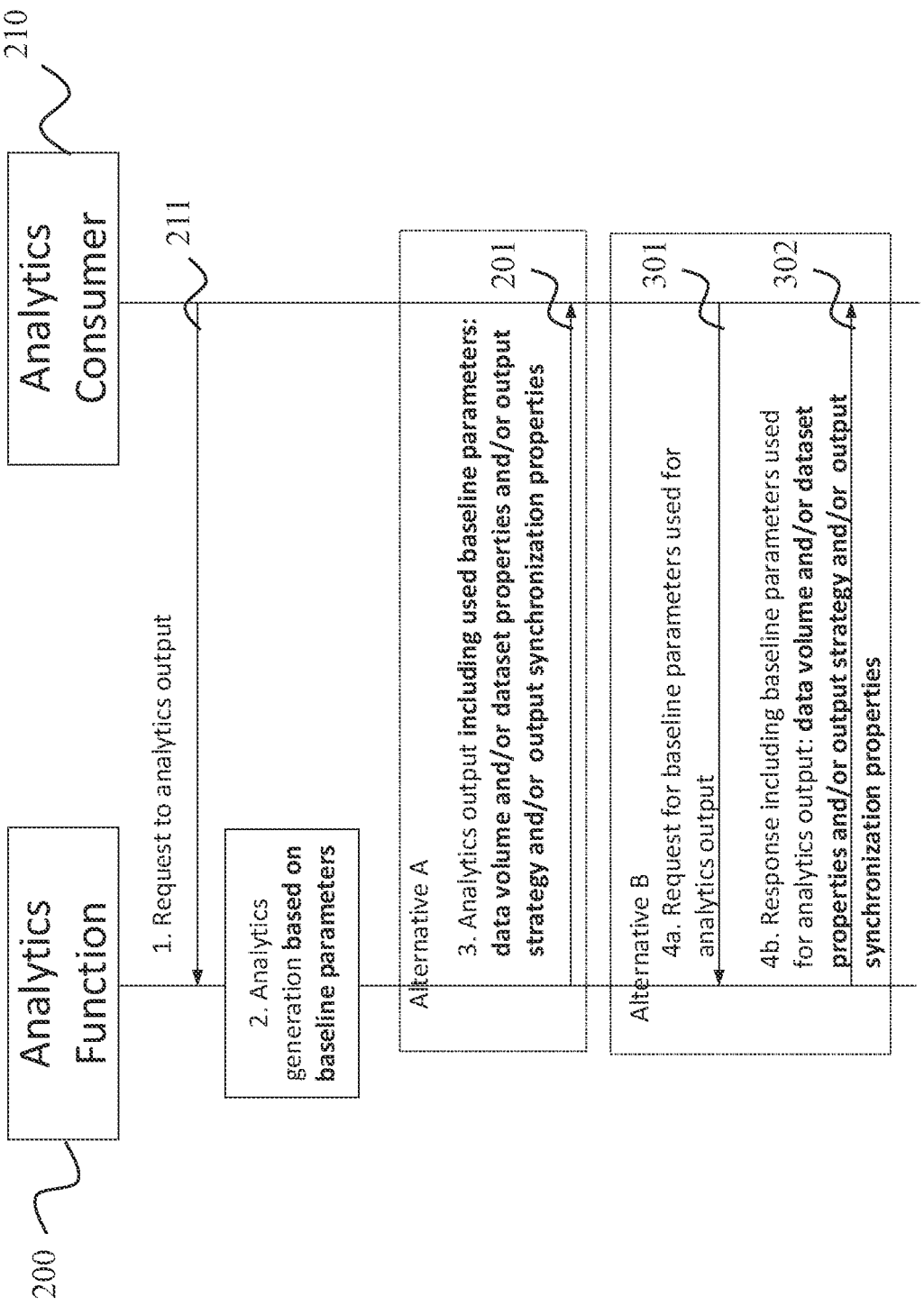
FIG. 3 shows entities according to embodiments of the disclosure for Operation Mode 1.

FIG. 3 shows the network entity 200 and the entity 210, respectively, according to embodiments of the disclosure, for the Operation Mode 1, wherein the entity 201 can become aware of the set of baseline parameters 202.

In this Operation Mode 1, the entity 210 may not explicitly request to the network entity 200 the set of baseline parameters 202 for the generation of the analytics output 201 requested. In this case, the network entity 200 may be configured with the mapping of one or more sets of analytics consumers and/or one or more sets of analytics types to one or more sets of baseline parameters 202, either per analytics output type or for all types of analytics output 201 that such analytics consumer might request (this is an example of the mapping/configuration of baseline parameters).

The entity 210, however, may receive from the network entity 210 the information about the baseline parameters 202 for generating the analytics output 201. The steps of a method for this purpose are illustrated in FIG. 3, and described as follows.

1. The entity 210 requests 211 and/or subscribes to the network entity 200, in order to receive one or more analytics outputs 201. The request 211 for the analytics output 201 may contain no specific information about the set of baseline parameters 202 for generating the analytics output 201.
2. The network entity 200 may be configured with the mapping of sets of baseline parameters 202 to be applied to consumers of analytics output(s) 201. For instance, the network entity 200 can be configured by OAM with the mapping that all analytics consumers of type A (e.g., Session Management Function (SMF)) may use, for all analytics output type they request, the baseline parameters X (e.g., data volume="50% of available data related to the requested analytics output type and analytics filters and/or analytics target"; dataset properties="ignoring outliers"; Output Strategy="gradient").

Based on the configuration of the set of baseline parameters 202 for a given analytics consumer and/or analytics type, the network entity 200 can generate one or more analytics outputs 201 based on the set of parameters 202 appropriate for the entity 210.

For instance:

If the set of baseline parameters 202 is configured with the tuple (output strategy="binary", the data volume="50% of available data related to the requested analytics output type and analytics filters and/or analytics target"), and the actual available collected data does not fulfill the 50% of the data volume, the network entity 200 may follow the "binary output strategy", i.e., the network entity 200 may provide an output, but the content of the output will comprise the probability of assertion set to zero and no content of an analytics output 201.

If the set of baseline parameter 202 is configured with the tuple (output strategy="gradient", the data volume="50% of available data related to the requested analytics output type and analytics filters and/or analytics target"), and the actual available collected data does not fulfill the 50% of the data volume, the network entity 200 may follow the "gradient output strategy". For instance, the network entity 200 may provide an output with content comprising the probability of assertion related to the level of accuracy×data volume defined in the set of baseline parameters 202, as well as the actual analytics output values (e.g., if the analytics type is "Service Experience", the actual analytics output value can be MOS=5).

In this disclosure, there are two possible alternatives, in which an analytics consumer (e.g., the entity 210) can become aware of the set of baseline parameters 202 for the analytics generation and/or that are available for analytics generation associated with a set of analytics consumers and/or a set of analytics types.

Alternative A is described in Step 3 of FIG. 3, and depicts the case, in which the set of baseline parameters 202 for the analytics output 201 generation is included together in the same message that has the actual values a requested/notified analytics output 201. That is, the network entity 200 may be configured to provide the set of baseline parameters 202 together with the analytics output 201.

Alternative B is described in Step 4 of FIG. 3, and depicts the case, in which there exist a dedicated service exposed by the network entity 200, which allows consumers of such service (e.g., the entity 210), to search, or query, or list, the set of baseline parameters 202. For instance, the entity 210 may send a request 301 for the set of baseline parameters 202, and the network entity 200 sends a response 302 including the set of baseline parameters 202. The alternative B can be also applied in any of the further operation modes 2 and 3.

In the case of Alternative A, whenever the actual analytics output values are provided from the network entity 200 to the entity 210, the network entity 200 may include, in the message sent back to the entity 210, the baseline parameters 202 for generating such analytics output 201 values.

In the case of Alternative B, the entity 210 request 301 to the network entity 200 the set of baseline parameters 202 for, or available for, the analytics output generation. The possible combination(s) of parameters that can be used with this kind of request 301 are:

Identification of one or more analytics output types, e.g., the analytics ID such as service experience, mobility, among other defined in 3GPP TS 23.288.

Identification of one or more generated analytics output 201, e.g., related to the identification of one or more analytics output values in case, for instances, when the entity 210 subscribes to receive notification for a certain type of analytics output 201. In this case, each instance, notification of the analytics output values has an identification, e.g., correlation ID.

One or more type of an analytics consumer of an analytics output 201, e.g., an NF Type such as "AMF Type" or "SMF Type", etc.

One or more identification of the analytics consumer (e.g., the entity 210) of an analytics output 201, e.g., SMF NF ID, AMF NF ID.

Figure 4:
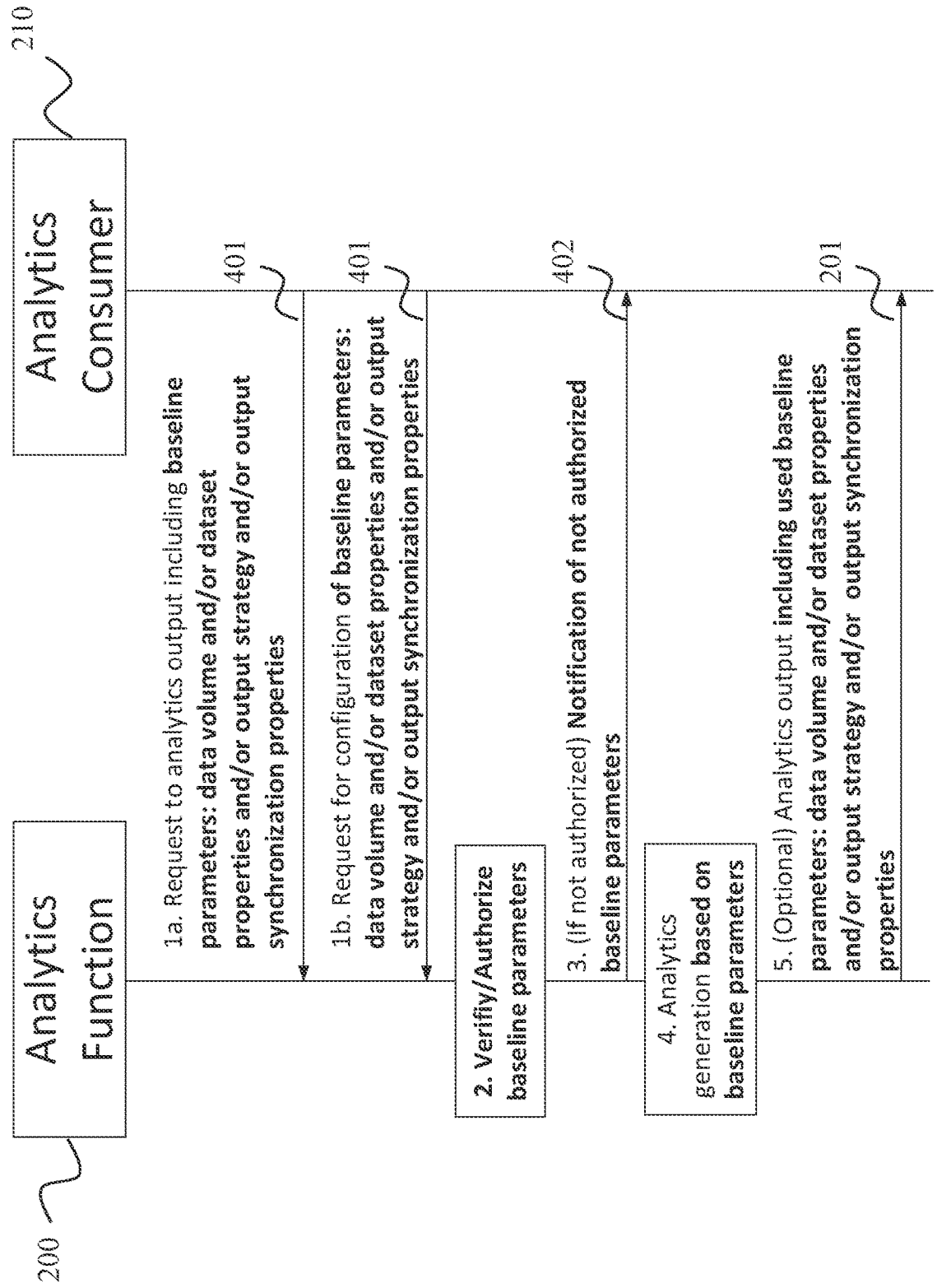
FIG. 4 shows entities according to embodiments of the disclosure for Operation Mode 2.

FIG. 4 shows the network entity 200 and the entity 210 according to embodiments of the disclosure, for Operation Mode 2, wherein the entity 210 can control the set of baseline parameters 202.

In this Operation Mode 2, the entity 210 may be able to send a request 401 and/or subscription to the network entity 200, specifying the set of baseline parameters 202 for the generation of analytics output(s), either for all types of analytics outputs 201 that such entity 210 requests/subscribes, or specific sets of baseline parameters 202 per type of analytics output 201 that such entity 210 might request/subscribe.

The steps of the method for this purpose are illustrated in FIG. 4 and described as follows.

1. The entity 201 sends to the network entity 200 a request 401 with a requested set of baseline parameters 202 for analytics generation. There may be different ways that the entity 210 can send such a requested set of baseline parameters 202 to the network entity 200. For instance:

1a. The entity 210 may request 401 and/or subscribe to the network entity 200, requesting a certain type of analytics output 201 (e.g., the analytics IDs defined in TS 23.288). In this request 401, the entity 210 may also include the requested set of baseline parameters 202 that should be used for the requested analytics output generation.

One possible alternative to this Step 1a is that the entity 210 can first invoke a service from the network entity 200 to list allowed sets of baseline parameters 202, as indicated in the Operation Mode 1. Based on the received sets of baseline parameters 202, the entity 210 may invoke services of the network entity 200 to request and/or subscribe to an analytics output 201 including, in such subscription, the proper set of baseline parameters 202.

1b. The network entity 200 may expose one or more dedicated services that can be invoked by the entity 210, in order to configure the set of baseline parameters 202 for the entity 210. The parameters of the service operation for configuring the baseline parameters 202 may comprise: an identification of the entity 210, one or more analytics output type identifications (e.g., a specific analytics ID or a list of analytics ID or "any", if the configuration should apply to all analytics output types), and one or more baseline parameters 202.

2. The network entity 200, upon receiving the request 401 for the analytics output 201 and the set of baseline parameters 202 from the entity 210, may verify, whether there are one or more baseline parameters 202 mapped to the entity 210. There may be different situations that can be enforced during the verification, authorization:

The network entity 200 may have no specific set of baseline parameters 202 configured for the entity 210, just an authorization to accept the request 401 from the entity 210. In this case, the network entity 200 may check, if the entity 210 is authorized to request the set of baseline parameters 202, and if such requested baseline parameters 202 are supported by the network entity 200.

The network entity 200 may be configured with one or more baseline parameters 202 for the entity 210. In this case, the network entity 200 may verify if the requested set of baseline parameters 202 is allowed (e.g., it may match them to the configured sets of baseline parameters 202).

3. In negative case of authorization and/or verification, the network entity 200 may send a response 402 to the entity 210, the response 402 indicating the reason for the rejection of the analytics generation request 401. Examples of reasons that can be returned by the network entity 200 are: the entity 210 is not authorized to request a set of baseline parameters 202, the requested set of baseline parameters 202 is not allowed for the entity 210.

4. In positive cases of authorization and/or verification, the network entity 200 may generate the requested analytics output 201 based on (e.g., using) the requested set of baseline parameters 202.

5. Optionally, the network entity 200 can include, in the response and/or notification of the analytics output 201, the set of baseline parameters 202 for the generated analytics output 201.

Figure 5:
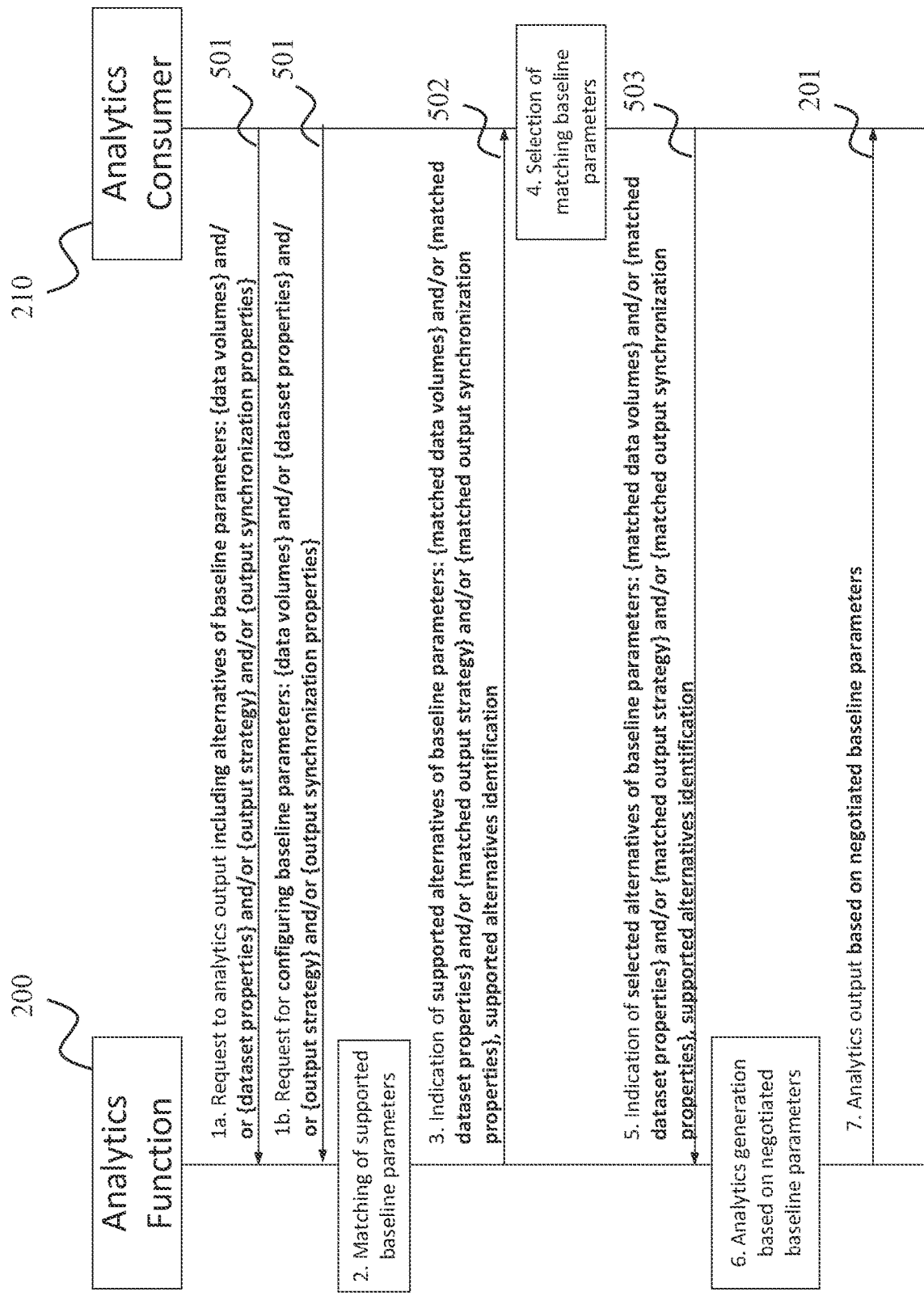
FIG. 5 shows entities according to embodiments of the disclosure for Operation Mode 3.

FIG. 5 shows the network entity 200 and the entity 210 according to embodiments of the disclosure, for Operation Mode 3, wherein the entity 210 and the network entity 200 can negotiate the set of baseline parameters 202 for the analytics generation.

In this Operation Mode 3, the entity 210 and the network entity 200 may be able to negotiate the set of baseline parameters 202 for the generation of the analytics output 201 for the entity 210.

The entity 210 and the network entity 200 may interact to exchange sets of baseline parameters 202, which they can respectively use, for instance, as a bidding process (one entity sends possible baseline parameters 202 to the other entity, the other entity selects matching baseline parameters 202, the other entity sends the matched baseline parameters 202, the one entity confirms the acceptance of the matched baseline parameters 202).

The steps of the method for Operation mode 3 are illustrated in FIG. 5 and described as follows.

1. In the Operation Mode 3, the difference from the other operation modes is the fact that the entity 210 and the network entity 200 may exchange one or more sets of baseline parameters 202 for the analytics output 201 generation associated with the set of analytics consumers and/or the set of analytics types. FIG. 5 illustrates the case, in which the entity 210 sends to the network entity 200 a request 501 including one or more proposed sets of baseline parameters 202.

When the initial request 501 sent from the entity 210 is a request 501 for an analytics output 201, which also includes the one or more proposed sets of baseline parameters 202, the fields of the request 501 may include the identification of the analytics output types requested by the entity 210.

When the initial request 501 sent from the entity 210 is a request 501 for configuration of the set of baseline parameters 202, the fields of the request 501 may include: the identification of the entity 210, one or more analytics output type identification (e.g., a specific analytics ID or a list of analytics ID or "any", if the configuration should apply to all analytics output types), the one or more sets of proposed baseline parameters 202, either per analytics output type or with the indication that such proposed sets of baseline parameters 202 could apply to all analytics output types indicated in the request 501.

2. Based on the one or more proposed sets of baseline parameters 202 provided by the entity 210, the network entity 200 may identify a subset of the proposed sets of baseline parameters 202, in particular a subset that it can support. For instance, the network entity 200 may be configured with a supported set of baseline parameters 202 for a set of analytics consumer and/or a set of analytics types (e.g., analytics output). The network entity 200 may compare the received proposed sets of baseline parameters 202 with its internal mapping, i.e., configuration.

3. Once the network entity 200 has identified the subset of baselines parameters 202 that can be supported, it may send a message 502 with such information together with an identification of the supported sets of baseline parameters 202 (e.g., identification of the supported one or more sets of baseline parameters) to the entity 210.

The identification of the supported sets of baseline parameters 202 is an important information generated by the network entity 200, which may be sent to the entity 210. This information may be used by the entity 210 to keep a mapping of the different requests for baseline parameter configurations it sends, for example, when there exist multiple network entities 200. One possible example of the generation of the identification of the supported sets of baseline parameters 202 is to use some hashing function that combines the identification of the network entity 200, the entity 210, and the supported sets of baseline parameters 202.

4. When the entity 210 receives the supported sets of baseline parameters 202 from the network entity 200, as well as the identification of the supported sets, it may further select from these supported sets of baseline parameters 202 the set of baseline parameters 202 that should be used for the analytics generation.

5. The entity 210 may then send a message 503 to the network entity 200, which includes the final selected set of baseline parameters 202, and may include the identification of the supported alternative sets.

6. Based on the received information from the entity 210 (i.e., the selected sets of baseline parameters 202, and identification of supported alternative sets), the network entity 200 may use the indication to find the mapping from the supported to the actual selected sets of baseline parameters 202. Then, it may verify whether the selected sets of baseline parameters 202 are compliant with the supported ones. If compliant, the network entity 200 may configure the selected sets of baseline parameters 202 for the generation of the analytics output 201 for the entity 210, and the associated set of analytics types according with the request in Step 1b of FIG. 5.

NOTE: It is possible that the enhancements of Analytics Function services at the network entity 200 and interactions capabilities defined in the different operation modes are used in combination. For instance, the alternative B of Operation Mode 1 can be used with any of the other operation modes.

In the following, more specific embodiments for analytics generation based on a set of baseline parameters 202, and the proposed Operation Modes 1-3, will be described.

Figure 6:
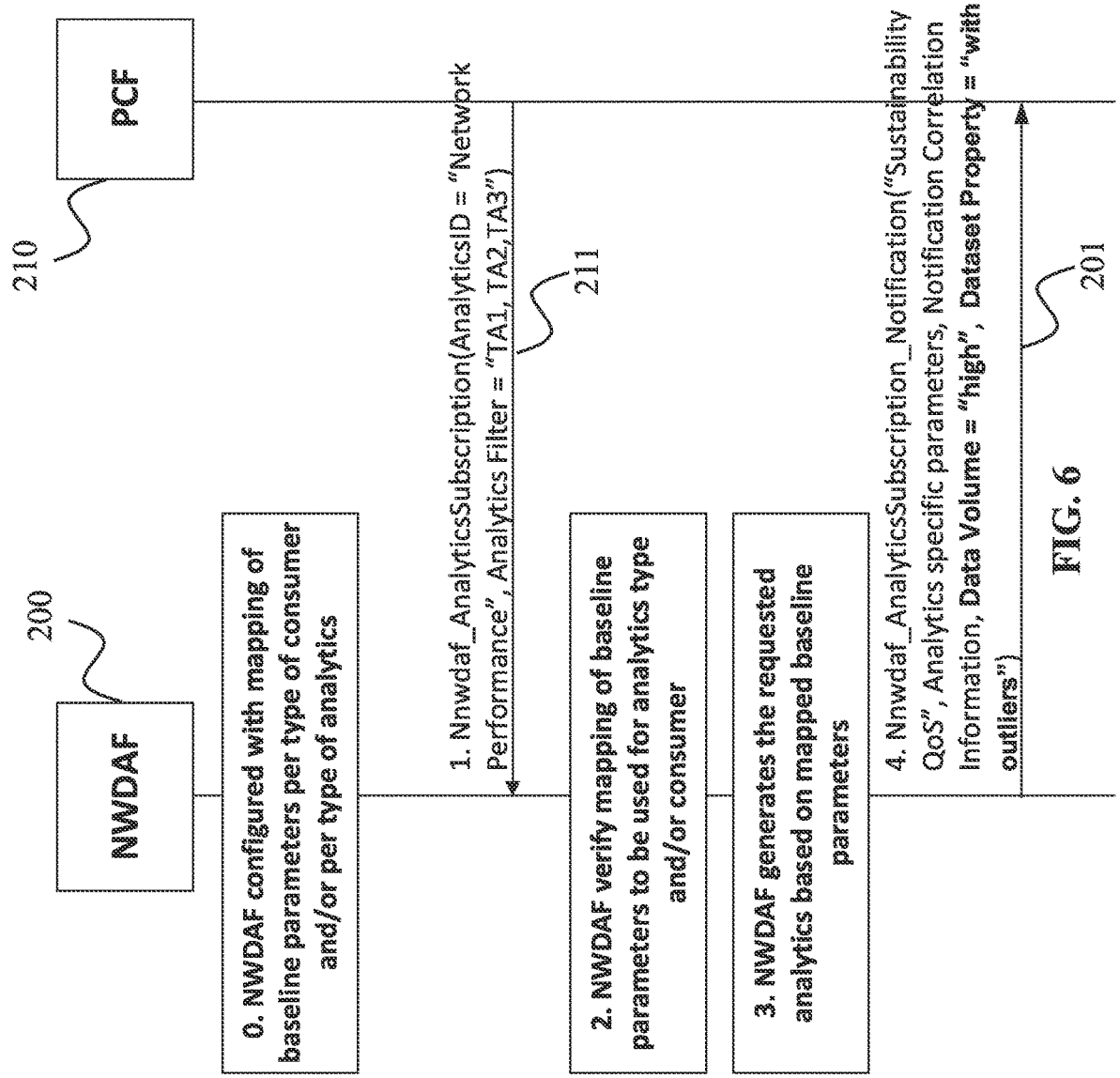
FIG. 6 shows entities according to embodiments of the disclosure for Operation Mode 1 for analytics output generation based on subscription to a single NWDAF using baseline parameters.

FIG. 6 illustrates an embodiment of the disclosure for Operation Mode 1. In this embodiment:

The NWDAF is the embodiment of the network entity 200.

The Policy Control Function (PCF) is the embodiment of the entity 210.

The NWDAF 200 may obtain the baseline parameters 202 via configuration. The NWDAF 200 may be configured with the mapping of baseline parameter values to be used per analytics type and/per analytics consumer.

The input parameters of the Nnwdaf_AnalyticsSubscription_notify, as well as the output parameters of Nnwdaf_AnalyticsInfo_Request service operations, may be extended to include the set of baseline parameters 202. In this embodiment, the NWDAF 200 output may include a subset of the baseline parameters 202: data volume, dataset property.

In this specific embodiment of the network entity 200 and entity 210, the PCF 210 may not be configured to request the precise values of the baseline parameters 202 for the generation of the analytics output 201 it requires. Nonetheless, the PCF 210 may become aware of the set of baseline parameters 202 for the generation of its analytics, through the extensions included in the output sent from the NWDAF 200 to the PCF 210. This extension being the introduction of the set of baseline parameters 202 in the definition of the response and/or notification service operation exposed by NWDAF 200.

Figure 7:
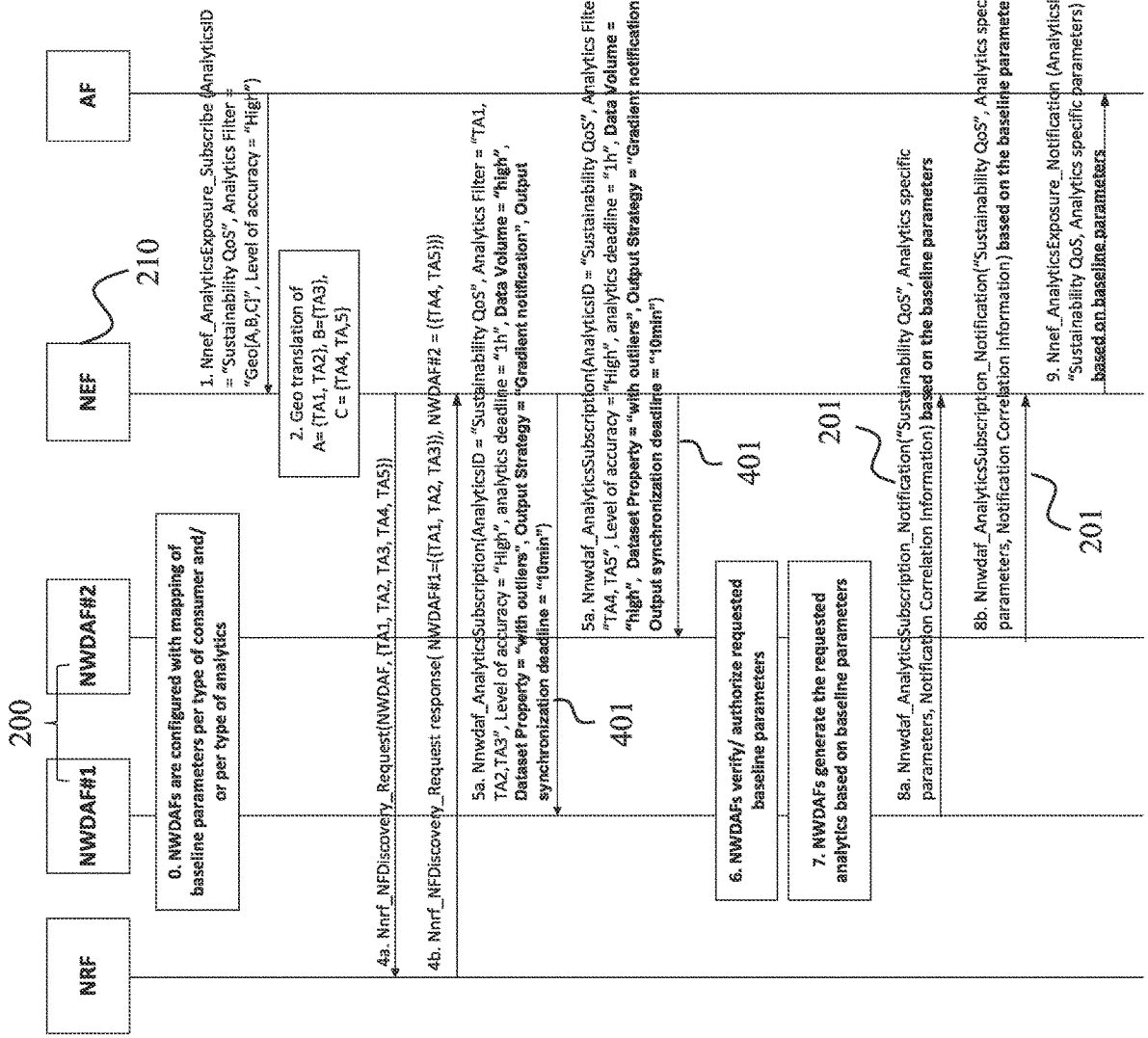
FIG. 7 shows entities according to embodiments of the disclosure for Operation Mode 2 for analytics output generation based on subscriptions to multiple NWDAF using baseline parameters.

FIG. 7 illustrates an embodiment of the Operation Mode 2. In this embodiment:

The NWDAF (NWDAF #1 and/or NWDAF #2) is/are the embodiment(s) of the network entity 200.

The NEF is the embodiment of the entity 210.

The NWDAF 200 may obtain the baseline parameters 202 in two ways:

The NWDAF 200 may be configured with the mapping of the set(s) of baseline parameters 202 to be used per analytics type and/or per analytics consumer.

The NWDAF 200 service operations for subscription/requests of analytics information may be extended with the set(s) of baseline parameters 202. In this way, the NEF 210 may request 401 the specific sets of the baseline parameters 202 for the analytics generation (of the requested analytics ID).

During Step 6 of FIG. 7, the NWDAF 200 may check the received requested set of baseline parameters 202 from the NEF 210 with the configured baseline parameters 202 per analytics ID and/or analytics consumer. If the requested baseline parameters 202 are authorized and/or allowed, the NWDAF 200 may generate the analytics based on the requested set of baseline parameters 202 included in the input parameters of the extended NWDAF services, and may provide the analytics output 201 based on the set of baseline parameters 202.

Figure 8:
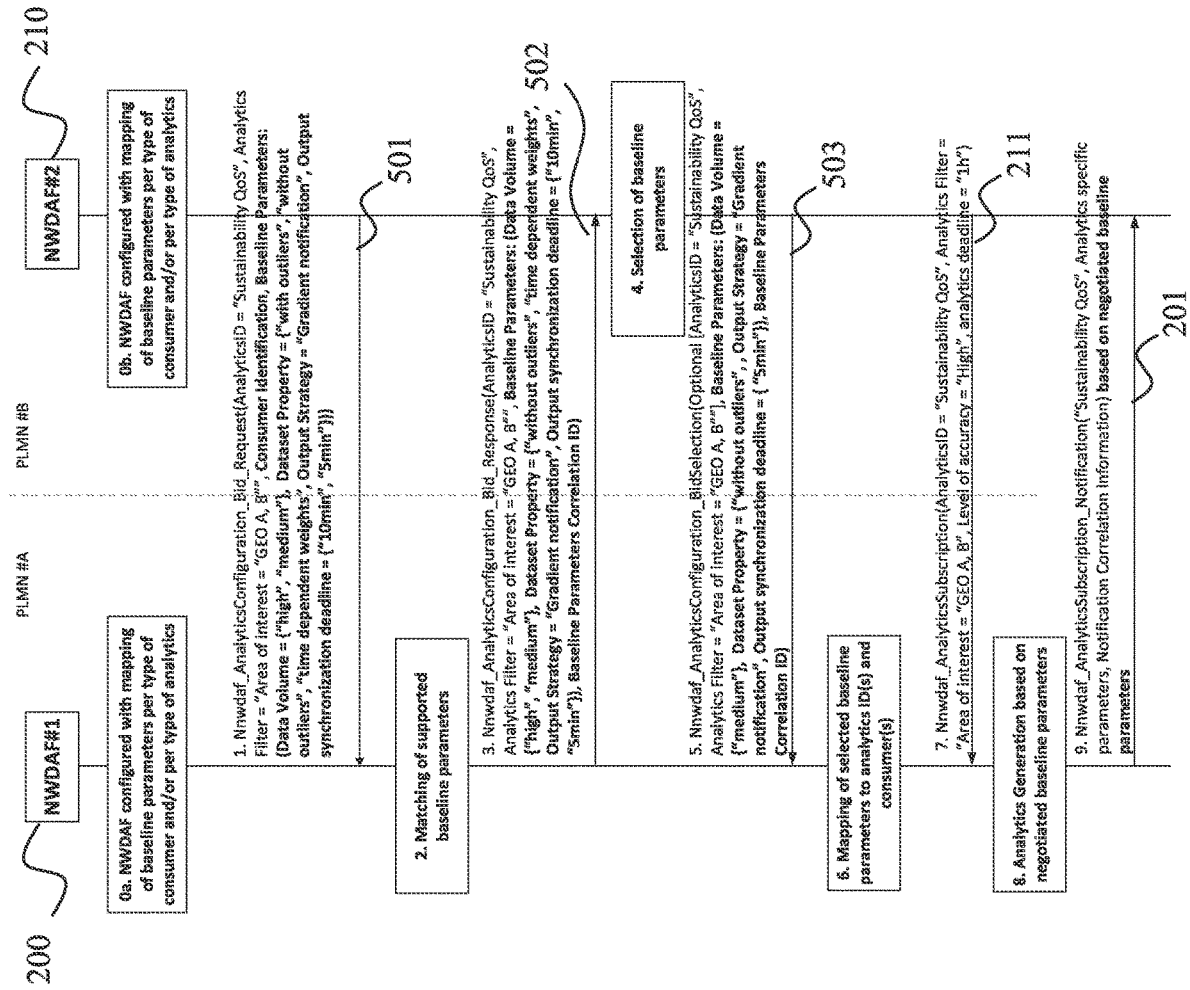
FIG. 8 shows entities according to embodiments of the disclosure for Operation Mode 3 for baseline parameters negotiation between H-NWDAFs and V-NWDAF.

The input parameters of the Nnwdaf_AnalyticsSubscription_subscribe service operation may be extended to include the set of baseline parameters 202, e.g.: data volume, dataset property, output strategy, output synchronization deadline FIG. 8 illustrates an embodiment of the Operation Mode 3. In this embodiment two NWDAFs belonging to different network operators (different Public Land Mobile Networks (PLMNs)) are shown. Such NWDAFs may communicate, in order to configure the set of baseline parameters 202 that should be used for analytics generation among such NWDAFs. This embodiment considers:

The NWDAF #1 is the embodiment of the network entity 200.

The NWDAF #2 is the embodiment of the entity 210.

The steps of this embodiment follow exactly the same description of the steps shown in FIG. 5.

A new service may defined for the NWDAFs 200, 210 to allow the configuration of the set of baseline parameters 202. FIG. 8 illustrates the new service, operations, and parameters used for the interaction among the NWDAFs 200, 210. In particular, NWDAF #2 sends a message 501 including proposes sets of baseline parameters 202 to the NWDAF #1, receives a message 502 including supported sets of baseline parameters 202 from the NWDAF #1, and returns a message 503 including a selected set of baseline parameters 202. NWDAF #1 uses the selected set of baseline parameters 202 to generate the analytics output 201, which is requested 211 by the NWDAF #2.

Another possible alternative for the embodiment of the new services of the NWDAF is based on the inclusion of a service operation allowing analytics consumers to query, search for potential alternative sets of baseline parameters 202 associated with an analytics consumer and/or set of analytics types. This case follows the alternative B defined in Operation Mode 1. In this case, the step 1a would not include the set of baseline parameters 202.

In this particular embodiment, as the NWDAF #1 200 and the NWDAF #2 210 belong to different operators, i.e., different PLMNs, it may be beneficial that the NWDAF #2 does not share the information of its own capabilities of generating analytics output 201, but requests a search in the other PLMN about its capabilities. In this way, both sides can reduce the amount of information that is shared among different operators.

In the following, further embodiments of the disclosure, applicable to the problem of generating a single analytics output 201 using the set of baseline parameters 202 from the analytics outputs of multiple NWDAF instances are described with respect to FIG. 9 and FIG. 10.

The implementations and features described below may be taken independently or together in any combination.

According to an implementation a first entity is provided that is configured to obtain Analytics Alignment Policy (AAP) policies. The first entity may generate and/or output a single analytics output 201 based on multiple analytics outputs according to the AAP to a second entity.

In an implementation the first entity may obtain, e.g. from the second entity, a request for generation of an analytics output 201, and an indication that such a request is related to the AAP. This means that the first entity receives an explicit indication to generate a single analytics output based on multiple analytics outputs. Alternatively, the first entity may identify that a request for an analytics output generation is associated with an AAP; and generates a single analytics output 201 based on multiple analytics outputs in accordance with the AAP.

In a further implementation the first entity is configured to provide to a third entity information indicating that the first entity includes the function of coordinator, wherein in the function of coordinator the first entity is configured to generate a single analytics output based on multiple analytics outputs according to the AAP.

In a further implementation the AAP policies may be obtained by configuration from another network entity, for instance from the OAM. Alternatively, the AAP policies may be pre-defined.

The multiple analytics outputs may be any of the following:
- The same analytics output type from multiple network entities 200 (or Analytics Functions).
- The same analytics type from the same network entity 200.
- Different analytics output types from multiple network entities 200.
- Different analytics types from the same network entity 200.

The analytics alignment policy (AAP) defines the mechanisms to map, process, compose field types and/or field values of multiple analytics outputs of the same type and/or from different analytics types into a single analytics output 201 that is provided to an analytics consumer (e.g., the entity 210). The multiple analytics outputs can be generated from the same and/or from multiple Analytics Functions (one or more network entities 200).

AAP may comprise one or more of the following fields:
- Type of the single analytics output to be generated based on the multiple analytics outputs
- Identification of the single analytics output type to be generated based on the multiple related analytics outputs.

In addition, for the single analytics output type to be generated, the AAP may further comprise at least one of:
- List of one or more related analytics output types that are mapped, processed, composed into the single analytics output type
- Identification of the multiple Analytics Functions (e.g., of one or more network entities 200) for generating the analytics outputs to be mapped into the single analytics output 201.
- List of composed field types of the single analytics output type to be generated based on multiple related analytics outputs types
- One or more related field types from an related analytics output type that have to be mapped and/or processed (also possible processing action could be aggregation, combination, data manipulation) to a composed field type of the single analytics output type. For instance, one analytics output type may be the service experience and one example of a field type from such an analytics output type may be the MOS field (which defines the value of quality of experience). In this example of the service experience type of analytics, on field of the single analytics output is also the MOS type, and the field type from an analytics output that needs to be mapped to such single analytics output type, is also the MOS field type from one of the multiple analytics outputs to be combined/mapped into the single analytics output.
- For each one of the related field types in the AAP, that should be mapped and/or processed into a field of the single analytics output 201, there may be a definition of the type of processing that should be applied. For example, if the field to be aggregated is the MOS value in the case of the service experience analytics output type (as defined in TS 23.288), the mechanism for aggregation could be defined as "select smallest value from the multiple"
- For each one of the related field types in the AAP that should be mapped and/or processed into a composed field type of the single analytics output 201, there may be a definition of the prioritization and/or weights of such field in the single analytics output 201. For instance, if there is a single analytics output 201 generated based on analytics outputs of different types, the different field types of the different analytics can be processed with different weights. This means that it is possible to configure how much each field type will influence the processing of the single analytics output 201.
- List of related field types from an analytics output type that should be allowed and/or restricted to be included in the composed fields of the single analytics output 201 generated from the multiple analytics outputs from the multiple Analytics Functions (e.g., of one or more network entities 200).

Figure 9:
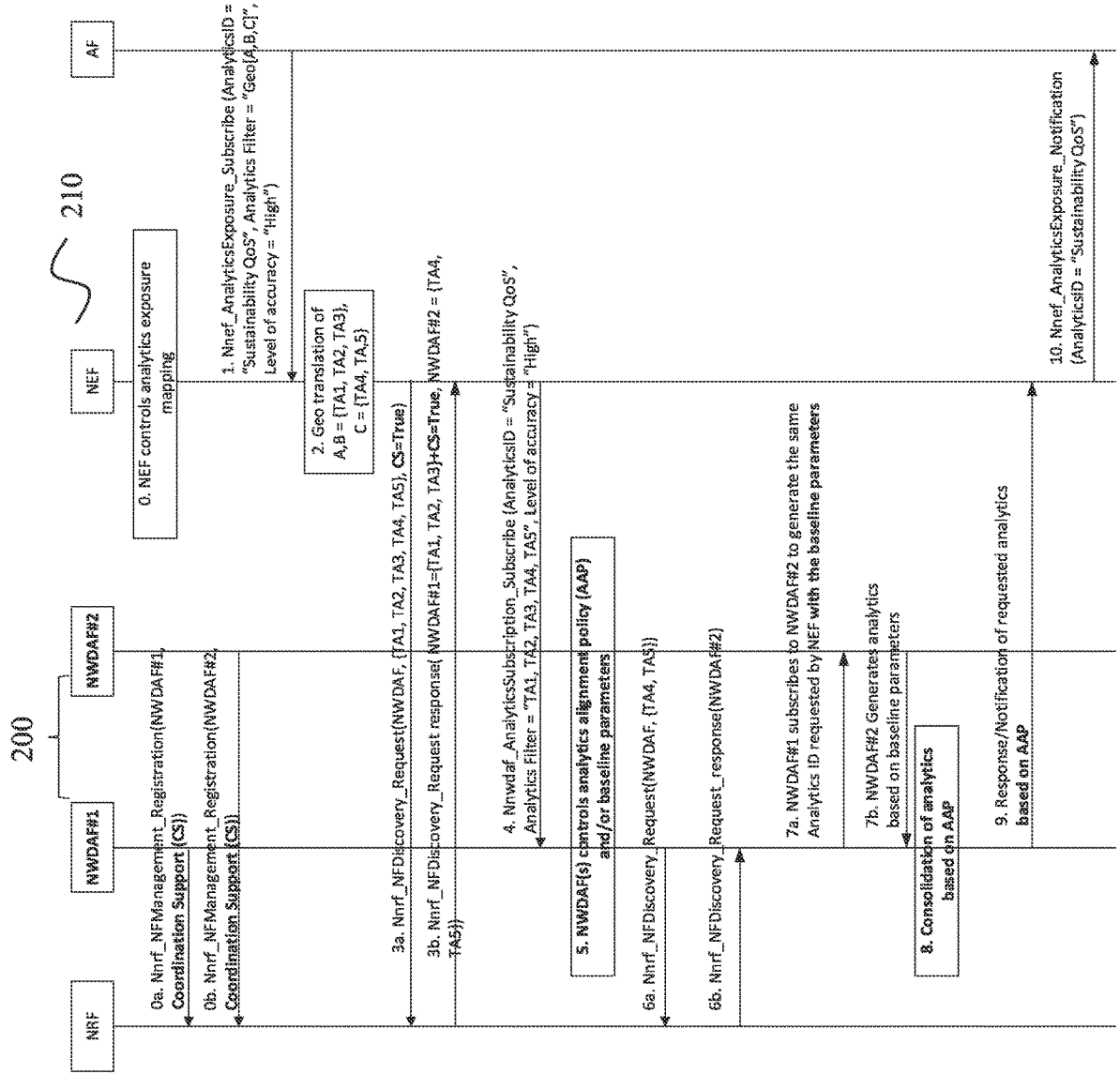
FIG. 9 shows entities according to embodiments of the disclosure for AAP, baseline parameters with NWDAF-centric approach.
Figure 10:
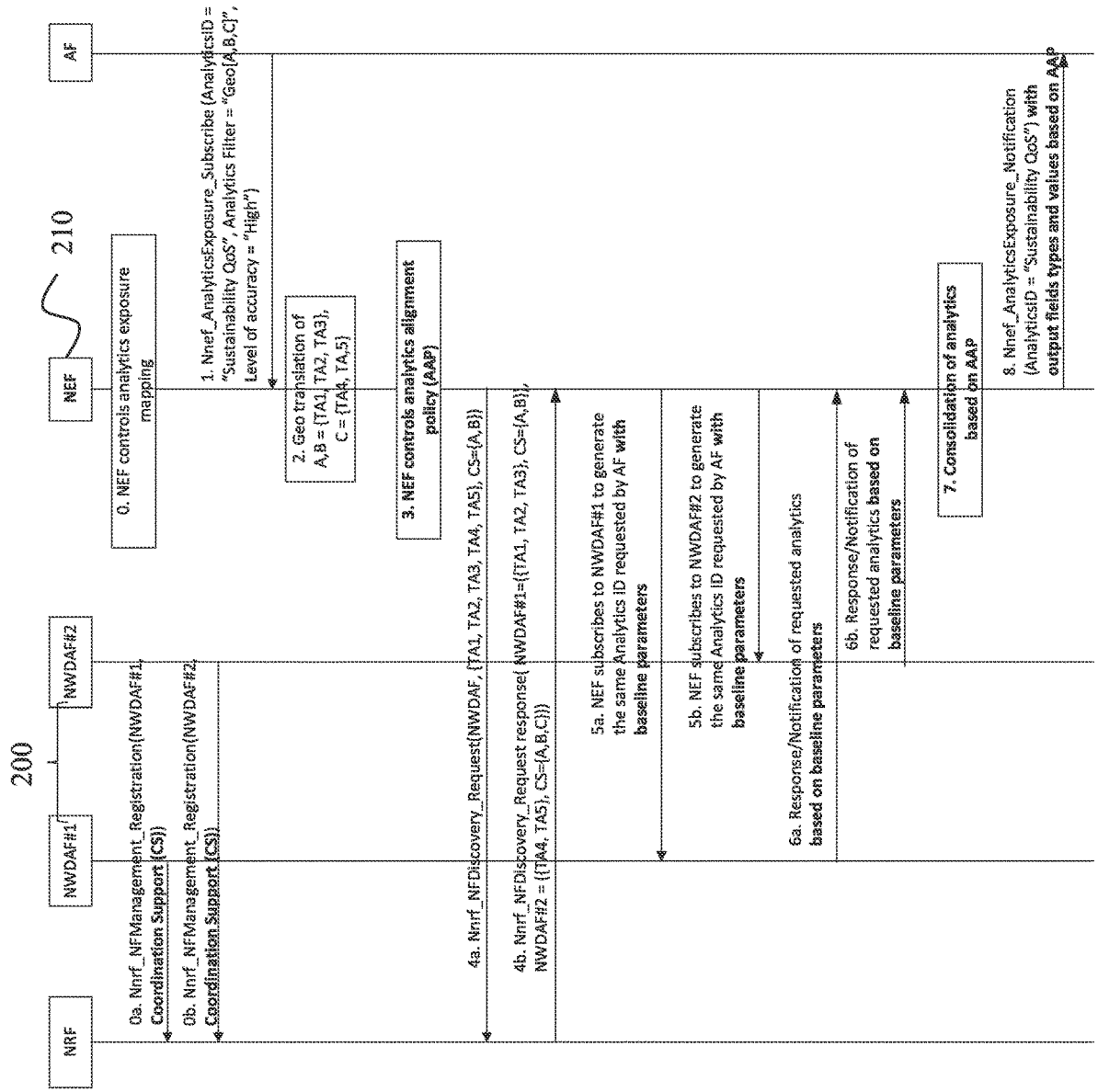
FIG. 10 shows entities according to embodiments of the disclosure for AAP, baseline parameters with NF-centric approach.

There are two possible directions for the embodiments of FIG. 9 and FIG. 10:

NWDAF-Centric Embodiment. In particular, FIG. 9 shows the embodiment and service extensions in NFs of 5GS for the embodiment of the NWDAF-Centric alternative:
- The NWDAF (NWDAF #1 and/or NWDAF #2) is the network entity 200, e.g., in 5GS that has the enhancements to operate with the coordination role and/or the AAP policies, so that it can coordinate the generation of a single analytics output 201 based on output of multiple NWDAF instances. This direction of embodiment requires:
  - Extension of NWDAF NF Profile with the indication of which NWDAF 200 can play the coordinator role.
  - Discovery of the NWDAFs 200 that have a coordination role in a given NWDAF serving area, which means that consumers may search a Network Repository Function (NRF) with the flag of coordinator role and receive the list of NWDAFs with such role.

NF-Centric Embodiment. In particular, FIG. 10 shows the embodiment and service extensions in NFs of 5GS for the embodiment of the NF-Centric alternative:
- Any NF (e.g., NWDAF or NEF, or SMF, etc.) may be enhanced with the capability to operate with the coordination role and/or the AAP policies for the generation of single analytics output 201 based on the output of multiple Analytics Functions (e.g., NWDAFs 200, e.g. of one or more network entities 200). This is the case, for instance, of an NEF (as entity 210) operating with the AAP policy in order to aggregate, map, process into a single analytics output to be delivered to an AF, the multiple analytics outputs from multiple NWDAFs 200.

The FIGS. 9 and 10 show embodiments of the disclosure considering the use of the coordination role, the APP, and the set of baseline parameters 202. In these embodiments the AAP used is related to the QoS Sustainability analytics output type. NWDAF #1 200 in FIG. 9 and NEF 210 in FIG. 10 identify the need for generating a single analytics output 201 based on multiple analytics outputs, when they check the area of interest of the requested analytics (Step 2 in FIG. 8 and Step 4 in FIG. 10). At this point in both embodiments, the entities, respectively NWDAF #1 and NEF will create an entry in the AAP data structure including the information necessary to map back the results from the multiple NWDAF instances into a single analytics output 201.

In the AAP data structure, there are two classes of fields:
Static fields which are the fields related to the mapping of one field type to another as well as the prioritization of such field in the single analytics output 201. These static fields are obtained, i.e., configured for instance by OAM at the entity operating with AAP via configuration. For instance, in these embodiments of FIGS. 9 and 10, the NWDAF and NEF may be pre-configured AAPs for being able to generate single analytics output 201 for all types of atomic single analytics output 201 (i.e., a single analytics output 201 that requires multiple analytics output of the same type). In the embodiment examples, they are pre-configured with an AAP for a single analytics output 201 for the "QoS Sustainability" analytics ID. In this specific example, following the definition of TS 23.288, the important analytics output field type is the "Crossed Reporting Threshold(s)". As different analytics outputs from the different NWDAFs might have completely different values for the same analytics output field, it is possible to have the pre-configuration of how to process such field type from the multiple analytics output into a single value. In this case, the AAP field for the type of processing, for the "Crossed Reporting Threshold(s)" field type, contains: "select worse performance". As in this embodiment the example of single analytics output 201 is based on analytics of the same type, therefore there is no need to pre-configure the AAP field "field prioritization".

Dynamic fields are the ones that depend on the actual execution of entities operating with AAP. In this case, the fields related to the identification of the Analytics Function generating the multiple analytics output will have their values dynamically instantiated when NWDAF #1 or NEF, in this embodiment, identify the NWDAFs that will provide the required multiple analytics outputs.

The step of consolidation of analytics based on AAP comprises, respectively Step 8 in FIG. 9 and Step 7 in FIG. 10, comprises: applying the processing mechanism defined in the AAP for the related field types of the received multiple analytics output, getting the result of such processing and relating/assigning/mapping it to the composed field type of single analytics output as defined in the AAP.

For instance, for the QoS sustainability analytics output type used in both FIG. 9 and FIG. 10, a single analytics output of type QoS sustainability needs to be generated based on multiple analytics output of the same type (i.e., QoS sustainability) generated by different NWDAFs.

Therefore, when in FIG. 9 and FIG. 10 NWDAF and NEF, respectively, "control AAP" is means that these NFs are configured with an AAP for generating a single analytics output of type QoS Sustainability based on multiple analytics output also from QoS sustainability type.

One possible example of a configured AAP for the single generation of an analytics ID of type "QoS Sustainability" (considering the fields of such analytics ID defined in TS 23.288 Clause 6.9.3) comprises:
Identification of single analytics type="Composed QoS sustainability statistics"
List of related analytics output types="QoS sustainability statistics"
List of composed field types=
Composed field type: "Applicable Area";
List of related field types from the multiple related analytics output types: "Applicable Area" from each related analytics output;
For the related field type "Applicable Area", the AAP defines the:
Processing Mechanisms: "Concatenate all values from all received analytics output"
Composed field type: "Applicable Time Period";
List of related field types from the multiple related analytics output "Applicable Time Period" from each analytics output;
For the related field type "Applicable Time Period", the AAP defines the:
Processing Mechanisms: "Concatenate all values from all received analytics output"
Composed field type: "Crossed Reporting Threshold(s)";
List of related field types from the multiple related analytics output "Crossed Reporting Threshold(s)" from each analytics output;
For the related field type "Applicable Time Period", the AAP defines the:
Processing Mechanisms: "Select if contains the lowest exceeding threshold value or select if contains the highest met value"

Figure 11:
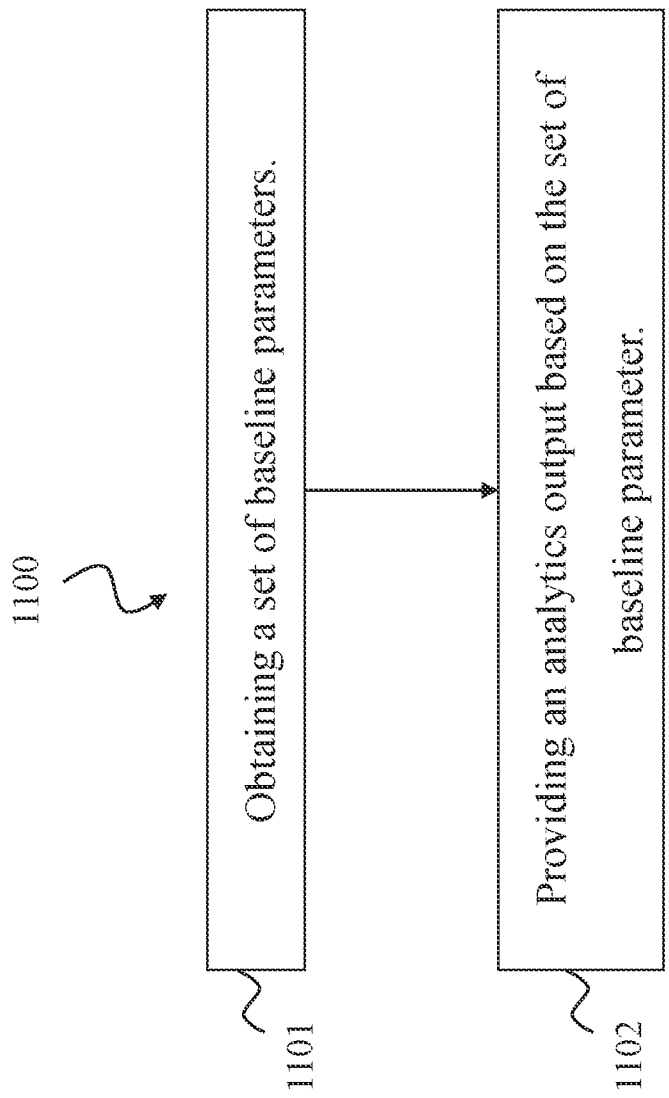
FIG. 11 shows a method according to an embodiment of the disclosure.

FIG. 11 shows a method 1100 for analytics generation of a mobile network, according to an embodiment of the disclosure. The method 1100 may be performed by the network entity 200, and corresponds to the method of the third aspect. The method comprises: a step 1101 of obtaining a set of baseline parameters 202, wherein the set of baseline parameters 202 (a) is associated with a set of analytics consumers and/or with a set of analytics types, and (b) is related to at least one of a statistical property and/or process and/or an output strategy for providing an analytics output 202; and a step 1102 of providing the analytics output 201 for the associated set of analytics consumers and/or the set of analytics types, wherein the analytics output 201 is based on the set of baseline parameters 202.

Figure 12:
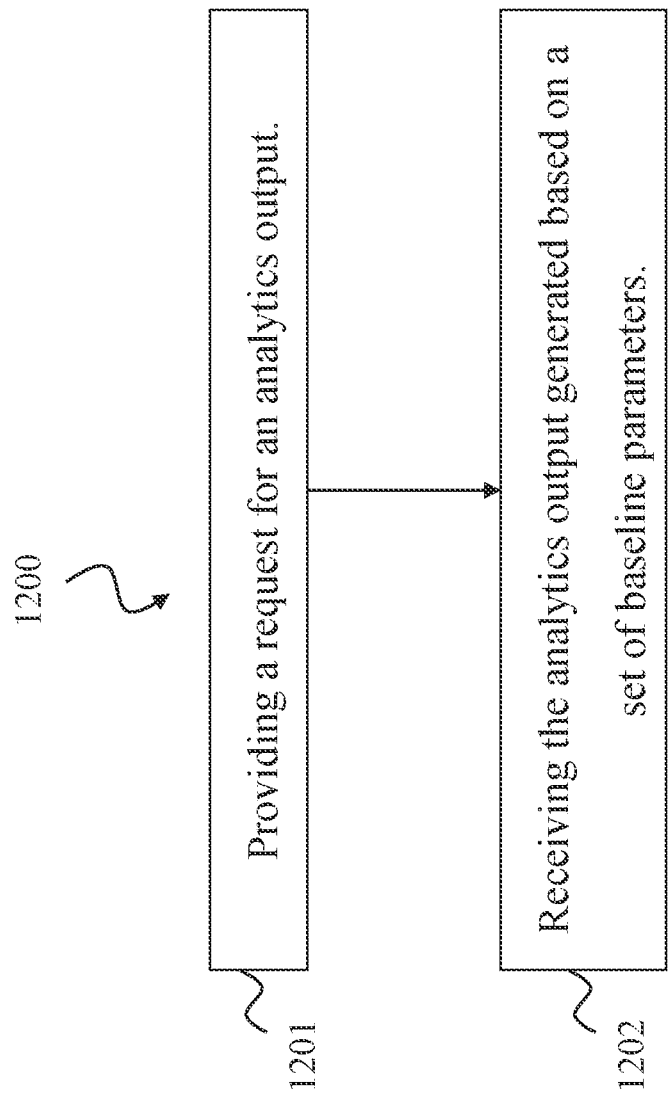
FIG. 12 shows a method according to an embodiment of the disclosure.

FIG. 12 shows a method 1200 for an analytics consumer consuming analytics of a mobile network. The method 1200 may be performed by the entity 210, and corresponds to the method of the fourth aspect. The method 1200 comprises: a step 1201 of providing a request 211 for an analytics output 201, wherein the analytics output 201 is for a set of analytics consumers and/or a set of analytics types; and a step 1202 of receiving the analytics output 201, wherein the analytics output 201 is generated based on a set of baseline parameters 202, wherein the set of baseline parameters 202 (a) is associated with the set of analytics consumers and/or with the set of analytics types, and (b) is related to at least one of a statistical property and/or process and/or an output strategy for providing the analytics output 201.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A network entity for analytics generation of a mobile network, the network entity comprising processing circuitry configured to:
   obtain a set of baseline parameters, wherein the set of baseline parameters:
   (a) is associated with a set of analytics types, and
   (b) is related to an output strategy for providing an analytics output; and
   provide the analytics output for the set of analytics types, wherein the analytics output is based on the set of baseline parameters;
   wherein the set of baseline parameters comprises the output strategy for providing the analytics output, wherein the output strategy defines a dependency between analytics accuracy and time-dependent analytics output.

2. The network entity according to claim 1, wherein the analytics accuracy is related to a data volume and a dataset property, wherein the dataset property indicates properties of a dataset and defines instructions for dataset manipulation, sorting, selection, and filtering.

3. The network entity according to claim 1, wherein the set of baseline parameters is further related to a statistical property and/or a process and further comprises at least one of:
   volume of data for generating the analytics output;
   one or more statistical properties or processes of data for generating the analytics output; or
   a synchronization deadline for providing the analytics output.

4. The network entity according to claim 1, wherein the processing circuitry is further configured to:
   provide the set of baseline parameters together with the analytics output.

5. The network entity according to claim 4, wherein the processing circuitry is further configured to:
   provide an indication of no support or no authorization regarding a requested set of baseline parameters, based on the requested set of baseline parameters being not supported by the network entity or not authorized.

6. The network entity according to claim 1, wherein the processing circuitry is further configured to:
   receive a first request to provide the set of baseline parameters for generating the analytics output; and
   provide the set of baseline parameters in response to the first request.

7. The network entity according to claim 6, wherein the first request comprises at least one of:
   identification of one or more analytics output types,
   identification of one or more analytics outputs,
   one or more types of a consumer of an analytics output, or
   one or more identifications of the consumer of an analytics output.

8. The network entity according to claim 1, wherein the processing circuitry is further configured to:
   receive a second request indicating a requested set of baseline parameters associated with a set of analytics consumers or with the set of analytics types; and
   wherein the analytics output is based on the requested set of baseline parameters as the set of baseline parameters.

9. The network entity according to claim 1, wherein the processing circuitry is further configured to:
   receive a second request indicating a requested set of baseline parameters associated with the set of analytics types;
   select a subset of baseline parameters from the requested set of baseline parameters; and
   include the subset of baseline parameters in the set of baseline parameters for generating the analytics output.

10. The network entity according to claim 9, wherein the second request comprises a request for the analytics output.

11. The network entity according to claim 1, wherein the processing circuitry is further configured to:
    receive a third request indicating one or more proposed sets of baseline parameters associated with the set of analytics types;
    select one or more supported sets of baseline parameters from the proposed set(s) of baseline parameters, the one or more supported sets of baseline parameters being supported by the network entity; and
    provide a response to the third request, the response indicating the one or more supported sets of baseline parameters.

12. The network entity according to claim 11, wherein the response to the third request further comprises an identification of the one or more supported sets of baseline parameters, and the identification of the one or more supported sets of baseline parameters relates the third request to the selected one or more supported sets of baseline parameters.

13. The network entity according to claim 12, wherein the processing circuitry is further configured to:
    receive a message indicating a selected set of baseline parameters from the one or more supported sets of baseline parameters; and
    use the selected set of baseline parameters as the set of baseline parameters for generating the analytics output.

14. The network entity according to claim 13, wherein the message indicating a selected set of baseline parameters from the one or more supported sets of baseline parameters further comprises the identification of the one or more supported sets of baseline parameters.

15. The network entity according to claim 1, configured to:
    obtain the set of baseline parameters for generating the analytics output for the set of analytics types by configuration.

16. The network entity according to claim 1, wherein:
    the network entity is a control plane entity, in particular comprising a Network Data Analytics Function (NWDAF), or
    the network entity is a management plane entity.

17. An entity for consuming analytics provided by a network entity for analytics generation of a mobile network, the entity comprising processing circuitry configured to:
    provide a request for an analytics output, wherein the analytics output is for a set of analytics types; and
    receive the analytics output, wherein the analytics output is generated by the network entity based on a set of baseline parameters,
    wherein the set of baseline parameters:
    (a) is associated with the set of analytics types, and
    (b) is related to an output strategy for providing the analytics output;
    wherein the set of baseline parameters comprises the output strategy for providing the analytics output, wherein the output strategy defines a dependency between analytics accuracy and time-dependent analytics output.

18. The entity according to claim 17, wherein the processing circuitry is further configured to:
obtain the set of baseline parameters associated with the set of analytics types together with a requested analytics output.

19. The entity according to claim 17, wherein the processing circuitry is further configured to:
provide a first request for the set of baseline parameters for generating the analytics output; and
receive the set of baseline parameters in response to the first request.

20. The entity according to claim 17, wherein the processing circuitry is further configured to:
provide a second request indicating a requested set of baseline parameters for generating the analytics output;
wherein the analytics output is generated by the network entity based on the requested set of baseline parameters.

21. The entity according to claim 17, wherein the processing circuitry is further configured to:
provide a third request indicating one or more proposed sets of baseline parameters associated with a set of analytics consumers and/or with the set of analytics types for generating the analytics output;
receive one or more supported sets of baseline parameters and/or an identification of the one or more supported sets of baseline parameters, the one or more supported sets of baseline parameters being included in the proposed set(s) of baseline parameters, and the identification of the one or more supported sets of baseline parameters relating the third request to the one or more supported sets of baseline parameters; and
provide a message indicating a selected set of baseline parameters and/or the identification of the one or more supported sets of baseline parameters, the selected set of baseline parameters being selected from the one or more supported sets of baseline parameters;
wherein the analytics output is generated by the network entity based on the selected set of baseline parameters.

22. A method for analytics generation of a mobile network, the method comprising:
obtaining a set of baseline parameters, wherein the set of baseline parameters:
(a) is associated with a set of analytics types, and
(b) is related to an output strategy for providing an analytics output; and
providing the analytics output for the set of analytics types, wherein the analytics output is based on the set of baseline parameters;
wherein the set of baseline parameters comprises the output strategy for providing the analytics output, wherein the output strategy defines a dependency between analytics accuracy and time-dependent analytics output.

23. A method for an analytics consumer consuming analytics of a mobile network, the method comprising:
providing a request for an analytics output, wherein the analytics output is for a set of analytics types; and
receiving the analytics output, wherein the analytics output is generated based on a set of baseline parameters, wherein the set of baseline parameters:
(a) is associated with the set of analytics types, and
(b) is related to an output strategy for providing the analytics output;
wherein the set of baseline parameters comprises the output strategy for providing the analytics output, wherein the output strategy defines a dependency between analytics accuracy and time-dependent analytics output.

* * * * *

UNITED STATES PATENT AND TRADEMARK OFFICE
CERTIFICATE OF CORRECTION

PATENT NO. : 11,956,132 B2
APPLICATION NO. : 17/898198
DATED : April 9, 2024
INVENTOR(S) : Marquezan et al.

It is certified that error appears in the above-identified patent and that said Letters Patent is hereby corrected as shown below:

In the Claims

Claim 16: Column 26, Line 46: "the network entity is a control plane entity, in particular" should read -- the network entity is a control plane entity --.

Signed and Sealed this
Thirtieth Day of July, 2024

Katherine Kelly Vidal
Director of the United States Patent and Trademark Office